US012756608B2

(12) United States Patent
Hu et al.

(10) Patent No.: US 12,756,608 B2
(45) Date of Patent: Oct. 6, 2026

(54) NARROW BANDWIDTH TRANSMISSION SCHEMES IN NEXT-GENERATION ENHANCED LONG RANGE WLAN

(71) Applicant: MediaTek Inc., Hsinchu City (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 337 days.

(21) Appl. No.: 18/510,338

(22) Filed: Nov. 15, 2023

(65) Prior Publication Data

US 2024/0171441 A1 May 23, 2024

Related U.S. Application Data

(60) Provisional application No. 63/384,106, filed on Nov. 17, 2022.

(51) Int. Cl.
*H04L 27/26* (2006.01)
*H04L 5/00* (2006.01)

(52) U.S. Cl.
CPC ...... *H04L 27/26132* (2021.01); *H04L 5/0053* (2013.01); *H04L 27/26025* (2021.01)

(58) Field of Classification Search
None
See application file for complete search history.

(56) References Cited

U.S. PATENT DOCUMENTS

2016/0066338 A1* 3/2016 Kwon .................. H04L 5/0023 370/330
2021/0329661 A1 10/2021 Alasti et al.
2021/0368443 A1* 11/2021 Park .................. H04L 27/26134

FOREIGN PATENT DOCUMENTS

EP 4277188 A1 11/2023

OTHER PUBLICATIONS

European Patent Office, Extended European Search Report in European Patent Application No. 23210322.6 1206, Apr. 17, 2024.

* cited by examiner

*Primary Examiner* — Walter J Divito
(74) *Attorney, Agent, or Firm* — Andy M. Han; Han IP PLLC

(57) ABSTRACT

Techniques pertaining to narrow bandwidth transmission schemes in next-generation Enhanced Long Range (ELR) wireless local area networks (WLANs) are described. An apparatus (e.g., station (STA)) generates a physical-layer protocol data unit (PPDU) comprising a spoofing preamble, an ELR preamble and an ELR data portion. The apparatus transmits the PPDU in an ELR wireless communication such that at least a portion of the ELR preamble is transmitted on at least one narrow-bandwidth subchannel of a wider bandwidth.

20 Claims, 32 Drawing Sheets

200

| Parameter | Value (20 MHz channel spacing) | Value (10 MHz channel spacing) | Value (5 MHz channel spacing) | Value (2.5MHz channel spacing) |
|---|---|---|---|---|
| $N_{SD}$: Number of data subcarriers | 48 | 48 | 48 | 48 |
| $N_{SP}$: Number of pilot subcarriers | 4 | 4 | 4 | 4 |
| $N_{ST}$: Number of subcarriers, total | 52 ($N_{SD}$ + $N_{SP}$) | 52 ($N_{SD}$ + $N_{SP}$) | 52 ($N_{SD}$ + $N_{SP}$) | 52(Nsd+Nsp) |
| $\Delta_F$: Subcarrier frequency spacing | 0.3125 MHz (=20 MHz/64) | 0.15625 MHz (= 10 MHz/64) | 0.078125 MHz (= 5 MHz/64) | 0.0390625MHz (=2.5MHz/64) |
| $T_{FFT}$: Inverse Fast Fourier Transform (IFFT) / Fast Fourier Transform (FFT) period | 3.2 μs (1/$\Delta_F$) | 6.4 μs (1/$\Delta_F$) | 12.8 μs (1/$\Delta_F$) | 25.6us(1/ΔF) |

FIG. 2

300

| Parameter | Value (20 MHz channel spacing) | Value (10 MHz channel spacing) | Value (5 MHz channel spacing) | Value (2.5MHz channel spacing) | Value (2.5MHz channel spacing) | Value (2.5MHz channel spacing) |
|---|---|---|---|---|---|---|
| $T_{PREAMBLE}$: PLCP preamble duration | 16 µs ($T_{SHORT}$ + $T_{LONG}$) | 32 µs ($T_{SHORT}$ + $T_{LONG}$) | 64 µs ($T_{SHORT}$ + $T_{LONG}$) | 128us (Tshort+Tlong) | 121.6us (Tshort+Tlong | 118.4us (Tshort+Tlong |
| $T_{SIGNAL}$: Duration of the SIGNAL BPSK-OFDM symbol | 4.0 µs ($T_{GI}$ + $T_{FFT}$) | 8.0 µs ($T_{GI}$ + $T_{FFT}$) | 16.0 µs ($T_{GI}$ + $T_{FFT}$) | 32.0us(TGI+Tfft) | 28.8us(TGI+Tfft) | 27.2us(TGI+Tfft) |
| $T_{GI}$: GI duration | 0.8 µs ($T_{FFT}$/4) | 1.6 µs ($T_{FFT}$/4) | 3.2 µs ($T_{FFT}$/4) | 6.4us (Tfft/4) | 3.2us (Tfft/8) | 1.6us (Tfft/16) |
| $T_{GI2}$: Training symbol GI duration | 1.6 µs ($T_{FFT}$/2) | 3.2 µs ($T_{FFT}$/2) | 6.4 µs ($T_{FFT}$/2) | 12.8us(Tfft/2) | 6.4us(Tfft/4) | 3.2us(Tfft/8) |
| $T_{SYM}$: Symbol interval | 4 µs ($T_{GI}$ + $T_{FFT}$) | 8 µs ($T_{GI}$ + $T_{FFT}$) | 16 µs ($T_{GI}$ + $T_{FFT}$) | 32us(TGI+Tfft) | 28.8us(TGI+Tfft) | 27.2us(TGI+Tfft) |
| $T_{SHORT}$: Short training sequence duration | 8 µs (10 × $T_{FFT}$/4) | 16 µs (10 × $T_{FFT}$/4) | 32 µs (10 × $T_{FFT}$/4) | 64us(10xTfft/4) | 64us(10xTfft/4) | 64us(10xTfft/4) |
| $T_{LONG}$: Long training sequence duration | 8 µs ($T_{GI2}$ + 2 × $T_{FFT}$) | 16 µs ($T_{GI2}$ + 2 × $T_{FFT}$) | 32 µs ($T_{GI2}$ + 2 × $T_{FFT}$) | 64us(TGI2+2xTfft) | 57.6us(TGI2+2xTfft) | 54.4us(TGI2+2xTfft) |

FIG. 3

400

| Modulation | Coding rate ($R$) | Coded bits per subcarrier ($N_{BPSC}$) | Coded bits per OFDM symbol ($N_{CBPS}$) | Data bits per OFDM symbol ($N_{DBPS}$) | Data rate (Mb/s) (20 MHz channel spacing) | Data rate (Mb/s) (10 MHz channel spacing) | Data rate (Mb/s) (5 MHz channel spacing) | Data rate (Mb/s) (2.5MHz channel spacing) |
|---|---|---|---|---|---|---|---|---|
| BPSK | 1/2 | 1 | 48 | 24 | 6 | 3 | 1.5 | 0.75 |
| BPSK | 3/4 | 1 | 48 | 36 | 9 | 4.5 | 2.25 | 1.125 |
| QPSK | 1/2 | 2 | 96 | 48 | 12 | 6 | 3 | 1.5 |
| QPSK | 3/4 | 2 | 96 | 72 | 18 | 9 | 4.5 | 2.25 |
| 16-QAM | 1/2 | 4 | 192 | 96 | 24 | 12 | 6 | 3 |
| 16-QAM | 3/4 | 4 | 192 | 144 | 36 | 18 | 9 | 4.5 |
| 64-QAM | 2/3 | 6 | 288 | 192 | 48 | 24 | 12 | 6 |
| 64-QAM | 3/4 | 6 | 288 | 216 | 54 | 27 | 13.5 | 6.75 |

FIG. 4

500

| Parameter | Value (5MHz channel spacing) | Value (2.5MHz channel spacing) |
|---|---|---|
| $N_{SD}$: Number of data subcarriers | 24 | 24 |
| $N_{SP}$: Number of pilot subcarriers | 2 | 2 |
| $N_{ST}$: Number of subcarriers, total | 26(Nsd+Nsp) | 26(Nsd+Nsp) |
| $\Delta_F$: Subcarrier frequency spacing | 0.15625MHz (=5MHz/32) | 0.078125MHz (=2.5MHz/32) |
| $T_{FFT}$: Inverse Fast Fourier Transform (IFFT) / Fast Fourier Transform (FFT) period | 6.4us(1/ΔF) | 12.8us(1/ΔF) |

FIG. 5

600

| Parameter | Value (5MHz channel spacing) | Value (2.5MHz channel spacing) |
|---|---|---|
| $T_{PREAMBLE}$: PLCP preamble duration | 32us (Tshort+Tlong) | 64us (Tshort+Tlong) |
| $T_{SIGNAL}$: Duration of the SIGNAL BPSK-OFDM symbol | 8.0us (TGI+Tfft) | 16.0us (TGI+Tfft) |
| $T_{GI}$: GI duration | 1.6us (Tfft/4) | 3.2us (Tfft/4) |
| $T_{GI2}$: Training symbol GI duration | 3.2us (Tfft/2) | 6.4us (Tfft/2) |
| $T_{SYM}$: Symbol interval | 8.0us (TGI+Tfft) | 16.0us (TGI+Tfft) |
| $T_{SHORT}$: Short training sequence duration | 16us (10xTfft/4) | 32us (10xTfft/4) |
| $T_{LONG}$: Long training sequence duration | 16us (TGI2+2xTfft) | 32us (TGI2+2xTfft) |

FIG. 6

700

(A)

$S_k$ has nonzero values $[0.5, -1, 1, -1, -1, -0.5] \times (1+j) \times \sqrt{2/3}$ on tones $k = [-12, -8, -4, 4, 8, 12]$ respectively (B)

$S_{-26,26} = \sqrt{(13/6)} \times \{0, 0, 1+j, 0, 0, 0, -1-j, 0, 0, 0, 1+j, 0, 0, 0, -1-j, 0, 0, 0, -1-j, 0, 0, 0, 1+j, 0, 0, 0, 0, 0,$ $0, 0, 0, -1-j, 0, 0, 0, -1-j, 0, 0, 0, 1+j, 0, 0, 0, 1+j, 0, 0, 0, 1+j, 0, 0, 0, 1+j, 0, 0\}$ The multiplication by a factor of $\sqrt{(13/6)}$ is in order to normalize the average power of the resulting OFDM symbol, which utilizes 12 out of 52 subcarriers.

FIG. 7

800

(A)

$$LTF_{-16:15} = \{0, 0, 0, 1, -1, 1, -1, -1, 1, -1, 1, 1, -1, 1, 1, 1, 0, -1, -1, -1, 1, -1, -1, -1, 1, -1, 1, 1, 1, -1, 0, 0\}$$

(B)

$$L_{-26,26} = \{1, 1, -1, -1, 1, 1, -1, 1, -1, 1, 1, 1, 1, 1, 1, -1, -1, 1, 1, -1, 1, -1, 1, 1, 1, 1, 0,$$
$$1, -1, -1, 1, 1, -1, 1, -1, 1, -1, -1, -1, -1, -1, 1, 1, -1, -1, 1, -1, 1, -1, 1, 1, 1, 1\}$$

FIG. 8

NARROW BANDWIDTH TRANSMISSION SCHEMES IN NEXT-GENERATION ENHANCED LONG RANGE WLAN

CROSS REFERENCE TO RELATED PATENT APPLICATION

The present disclosure is part of a non-provisional patent application claiming the priority benefit of U.S. Provisional Patent Application No. 63/384,106, filed 17 Nov. 2022, the content of which herein being incorporated by reference in its entirety.

TECHNICAL FIELD

The present disclosure is generally related to wireless communications and, more particularly, to narrow bandwidth transmission schemes in next-generation Enhanced Long Range (ELR) wireless local area networks (WLANs).

BACKGROUND

Unless otherwise indicated herein, approaches described in this section are not prior art to the claims listed below and are not admitted as prior art by inclusion in this section.

In wireless communications such as Wi-Fi (or WiFi) in accordance with the Institute of Electrical and Electronics Engineers (IEEE) 802.11 standards, one of the key objectives for next-generation WLAN systems relates to improvement of data rate at different signal-to-noise ratio (SNR) levels. Some Internet-of-Things (IoT) applications, such as wireless video doorbells and outdoor surveillance cameras, require longer coverage WiFi solutions. Narrow bandwidth has the advantage of higher power density per frequency tone for a given total transmission power. Moreover, narrow bandwidth subchannels can be duplicated for transmission so as to improve the robustness on the receiving end. In an IEEE 802.11ah sub-1-GHz (S1G) system, narrow bandwidths 1 GHZ, 2 GHZ, 4 GHZ, 8 GHZ and 16 GHz have been considered and supported for longer range coverage and outdoor applications. In legacy IEEE 802.11g systems, narrow bandwidths 5 MHz and 10 MHz by down-clocked from 20 MHz have been introduced. However, how to perform transmission in the narrow bandwidths 2.5 MHz, 5 MHz and 10 MHz for next-generation ELR WLANS remains to be specified. Therefore, there is a need for a solution of narrow bandwidth transmission schemes in next-generation ELR WLANs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to narrow bandwidth transmission schemes in next-generation ELR WLANs.

In one aspect, a method may involve generating a physical-layer protocol data unit (PPDU) comprising a spoofing preamble, an ELR preamble and an ELR data portion. The method may also involve transmitting the PPDU in an ELR wireless communication such that at least a portion of the ELR preamble is transmitted on at least one narrow-bandwidth subchannel of a wider bandwidth.

In another aspect, an apparatus may include a transceiver configured to communicate wirelessly and a processor coupled to the transceiver. The processor may generate a PPDU comprising a spoofing preamble, an ELR preamble and an ELR data portion. The processor may also transmit the PPDU in an ELR wireless communication such that at least a portion of the ELR preamble is transmitted on at least one narrow-bandwidth subchannel of a wider bandwidth.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design under a proposed scheme in accordance with the present disclosure.

FIG. 3 is a diagram of an example design under a proposed scheme in accordance with the present disclosure.

FIG. 4 is a diagram of an example design under a proposed scheme in accordance with the present disclosure.

FIG. 5 is a diagram of an example design under a proposed scheme in accordance with the present disclosure.

FIG. 6 is a diagram of an example design under a proposed scheme in accordance with the present disclosure.

FIG. 7 is a diagram of an example design under a proposed scheme in accordance with the present disclosure.

FIG. 8 is a diagram of an example design under a proposed scheme in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to narrow bandwidth transmission schemes in next-generation ELR WLANs. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M.

Figure 1:
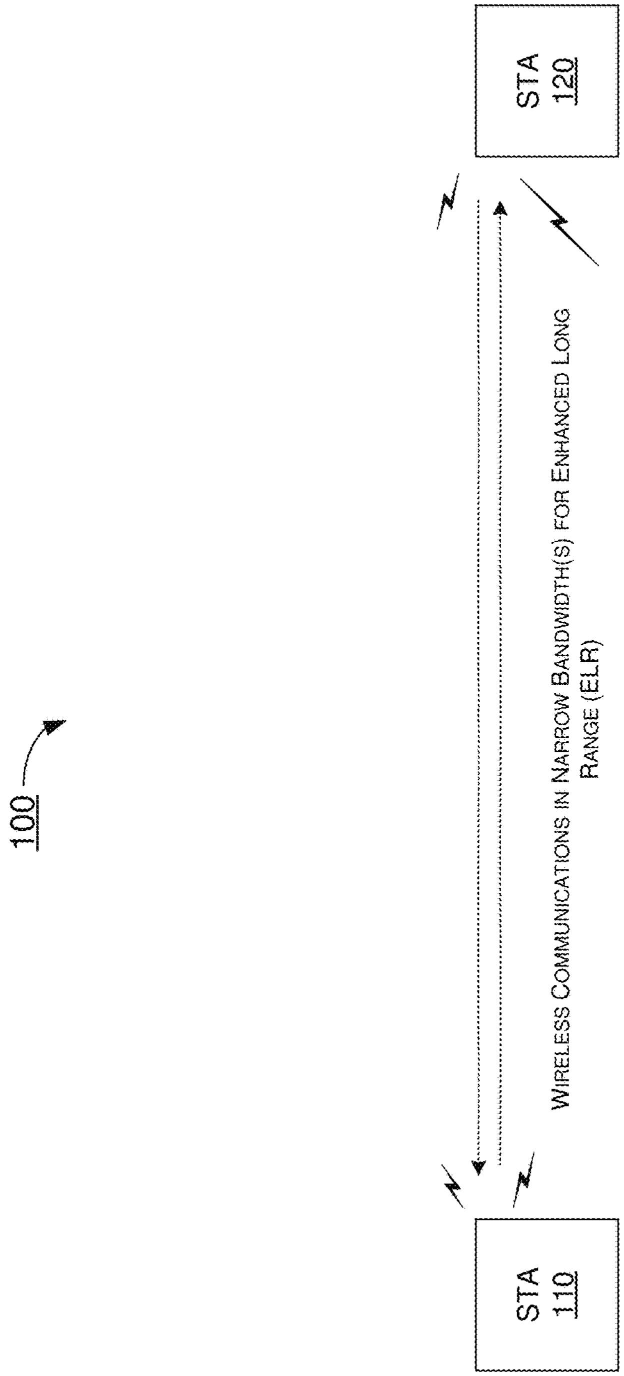
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 32 illustrate examples of implementation of various proposed schemes in network environment 100 in accordance with the present disclosure. The following description of various proposed schemes is provided with reference to FIG. 1~FIG. 32.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11be and future-developed standards such as IEEE 802.11bn). Each of STA 110 and STA 120 may be configured to communicate with each other by utilizing the narrow bandwidth transmission schemes in next-generation ELR WLANs in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

FIG. 2 illustrates an example design 200 under a proposed scheme in accordance with the present disclosure. Design 200 may pertain to physical-layer (PHY) parameters related to narrow bandwidths for ELR transmission under a first option (Option-1). Referring to FIG. 2, the PHY parameters in design 200 may be for the narrow bandwidths of 10 MHz, 5 MHz and 2.5 MHz, which may be down-clocked from 20 MHz by two times (2×), four times (4×) and eight times (8×), respectively, for bandwidth (BW)=10 MHz, 5 MHz and 2.5 MHz. In design 200, the fast Fourier transform (FFT) size ($N_{fft}$)=64 may be fixed for bandwidths 20 MHz, 10 MHz, 5 MHz and 2.5 MHz. Moreover, in design 200, subcarrier spacing (SCS or ΔF or Fscs) may be scalable with 312.5 kHz*1/($2^n$), n=0, 1, 2, 3 for BW=20 MHz, 10 MHz, 5 MHZ, 2.5 MHz.

FIG. 3 illustrates an example design 300 under a proposed scheme in accordance with the present disclosure. Design 300 may pertain to PHY parameters related to narrow bandwidths for ELR transmission under Option-1, and design 300 may provide the 2.5 MHz narrow bandwidth with different guard interval (GI) length options. Referring to FIG. 3, there may be different GI and GI2 duration options for the narrow bandwidth 2.5 MHz. In the present disclosure, including FIG. 3, TGI and TGI2 denote the length or duration of GI and GI2, respectively, $T_{short}$ denotes short duration, $T_{long}$ denotes long duration, and $T_{fft}$ denotes the FFT period.

FIG. 4 illustrates an example design 400 under a proposed scheme in accordance with the present disclosure. Design 400 may pertain to example data rates for narrow bandwidths 10 MHz, 5 MHz and 2.5 MHz. In scenario 400, GI may be assumed to be 0.8 μs, 1.6 μs, 3.2 μs and 6.4 μs for 20 MHz, 10 MHz, 5 MHz and 2.5 MHz, respectively. The four right-most columns of the table in FIG. 4 shows data rates for 20 MHz, 10 MHz, 5 MHz and 2.5 MHz channel spacing under different modulations including binary phase-shift keying (BPSK), quadrature phase-shift keying (QPSK), 16 quadrature amplitude modulation (16-QAM) and 64 quadrature amplitude modulation (64-QAM).

FIG. 5 illustrates an example design 500 under a proposed scheme in accordance with the present disclosure. Design 500 may pertain to PHY parameters related to narrow bandwidths for ELR transmission under a second option (Option-2). Referring to FIG. 5, the PHY parameters in design 500 may be for the narrow bandwidths of 5 MHz and 2.5 MHz. In design 500, $N_{fft}$=32 for 5 MHz and 2.5 MHz. The subcarrier spacing (SCS or ΔF or Fscs)=156.25 kHz for 5 MHz and 78.125 kHz for 2.5 MHz. Additionally, in design 500, GI=1.6 us and 3.2 us for 5 MHz and 2.5 MHz, respectively. Moreover, the symbol interval ($T_{SYM}$)=8 us and 16 us for 5 MHz and 2.5 MHz, respectively.

FIG. 6 illustrates an example design 600 under a proposed scheme in accordance with the present disclosure. Design 600 may pertain to PHY parameters related to narrow bandwidths for ELR transmission under Option-2, and design 600 may provide 5 MHz and 2.5 MHz with different GI length options. Referring to FIG. 6, there may be different GI and GI2 duration options for 5 MHz and 2.5 MHz. In design 600, ΔF=156.25 kHz for 5 MHz and ΔF=78.125 kHz for 2.5 MHz.

FIG. 7 illustrates an example design 700 under a proposed scheme in accordance with the present disclosure. Design 700 may pertain to a legacy short training field (L-STF) sequence and transmission for narrow bandwidths. In design 700, for $N_{fft}$=32 of 2.5 MHz or 5 MHz, the short training field (STF) sequence defined in IEEE 802.11ah may be reused per-subchannel. Part (A) of FIG. 7 shows the L-STF sequence as defined. For $N_{fft}$=64 of 2.5 MHz or 5 MHz or 10 MHz, the non-high-throughput (non-HT) STF sequence defined in IEEE 802.11g may be reused per-subchannel. Part (B) of FIG. 7 shows the L-STF sequence as defined.

FIG. 8 illustrates an example design 800 under a proposed scheme in accordance with the present disclosure. Design 800 may pertain to a legacy long training field (L-LTF) sequence and transmission for narrow bandwidths. In design 800, for $N_{fft}$=32 of 2.5 MHz or 5 MHz, the long training field (LTF) sequence defined in IEEE 802.11ah may be reused per-subchannel. Part (A) of FIG. 8 shows the L-LTF sequence as defined. For $N_{fft}$=64 of 2.5 MHz or 5 MHz or 10 MHz, the non-HT LTF sequence defined in IEEE 802.11g may be reused per-subchannel. Part (B) of FIG. 8 shows the L-LTF sequence as defined.

Figure 9:
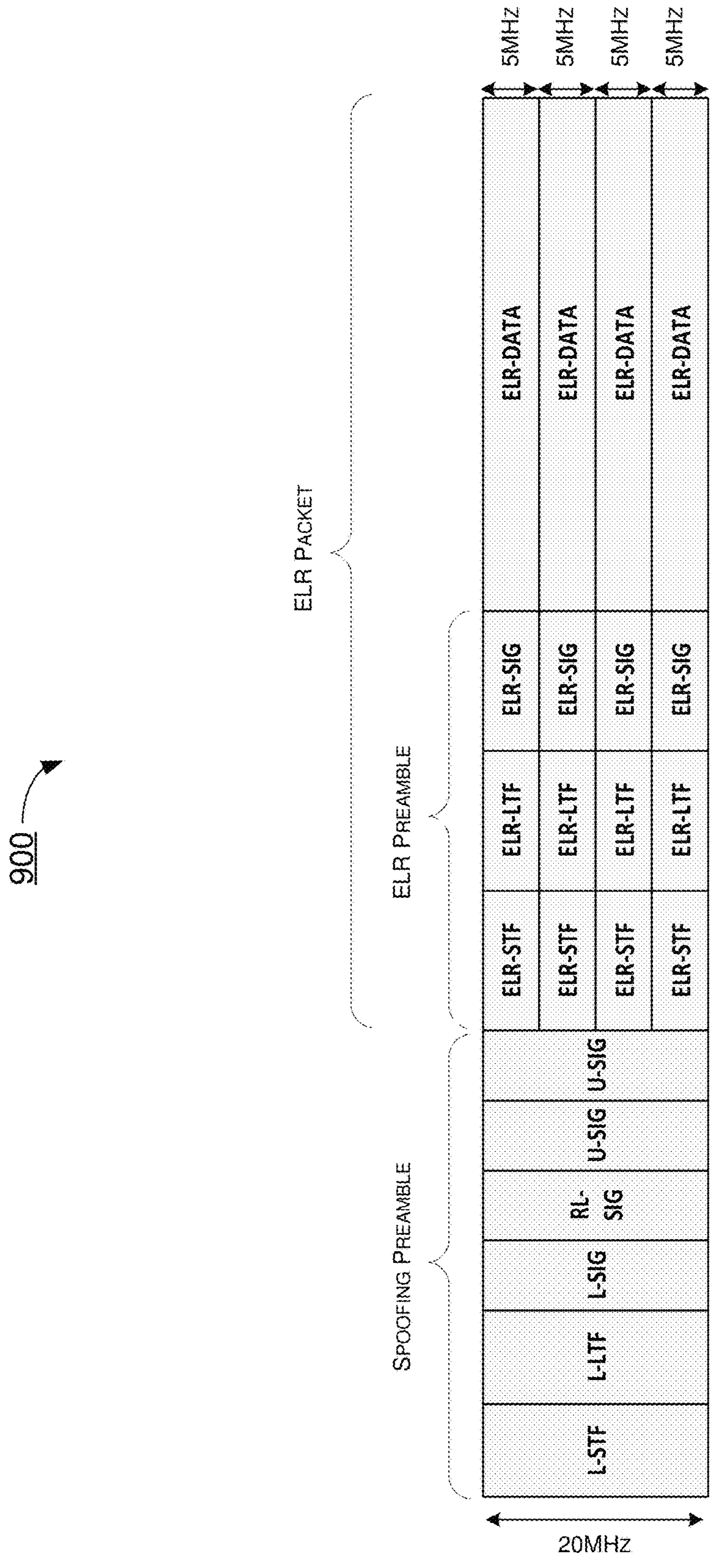
FIG. 9 is a diagram of an example design under a proposed scheme in accordance with the present disclosure.

FIG. 9 illustrates an example design 900 under a proposed scheme in accordance with the present disclosure. Design 900 may pertain to a PPDU for 5 MHz transmission in next-generation ELR WLANs under a first option (Option-1). In design 900, the SCS=312.5 kHz/4=78.125 kHz, which may be the same as an IEEE 802.11be SCS. Moreover, in design 900, $N_{fft}$=64, a discrete Fourier transform (DFT) period ($T_{dft}$)=12.8 μs, and GI=3.2 μs. Furthermore, L-STF and L-LTF may be reused for ELR short training field (ELR-STF) and ELR long training field (ELR-LTF), respectively.

Referring to FIG. 9, a PPDU transmitted in a 20 MHz bandwidth under Option-1 may include a spoofing preamble and an ELR packet including an ELR preamble and an ELR data portion (ELR-Data). The spoofing preamble may include certain fields such as L-STF, L-LTF, legacy signal (L-SIG), repeated legacy signal (RL-SIG), universal signal (U-SIG) and another U-SIG. Contents of the spoofing preamble may be transmitted on the 20 MHz bandwidth. For simplicity and to avoid redundancy, listing of the fields in the spoofing preamble will not be repeated in other designs described below. The ELR preamble may include certain fields such as ELR-STF, ELR-LTF and ELR signal (ELR-SIG). The duration of ELR-STF and ELR-LTF may be parameter dependent (e.g., dependent on ΔF and so on). Contents of the ELR packet may be transmitted and processed on a per-5 MHz subchannel non-HT duplication basis, which may aid ELR packet detection on the receiving end. That is, transmission of the ELR packet may involve low coding rate for ELR-SIG and ELR-Data, dual-carrier modulation (DCM) and tone repetition. The per-5 MHz subchannel non-HT duplication may support multiple users by assigning each user to one or more different subchannels.

It is noteworthy that, for BW=5 MHz, the subcarrier frequency spacing (SCS or ΔF) may be either 78.125 kHz or 156.25 kHz, the PHY related parameters may be defined in designs 500 and 600 and shown in FIG. 5 and FIG. 6. The SCS or ΔF of 78.125 kHz or 156.25 kHz may be applied on all the 5 MHz bandwidth ELR design options in other designs described below.

Figure 10:
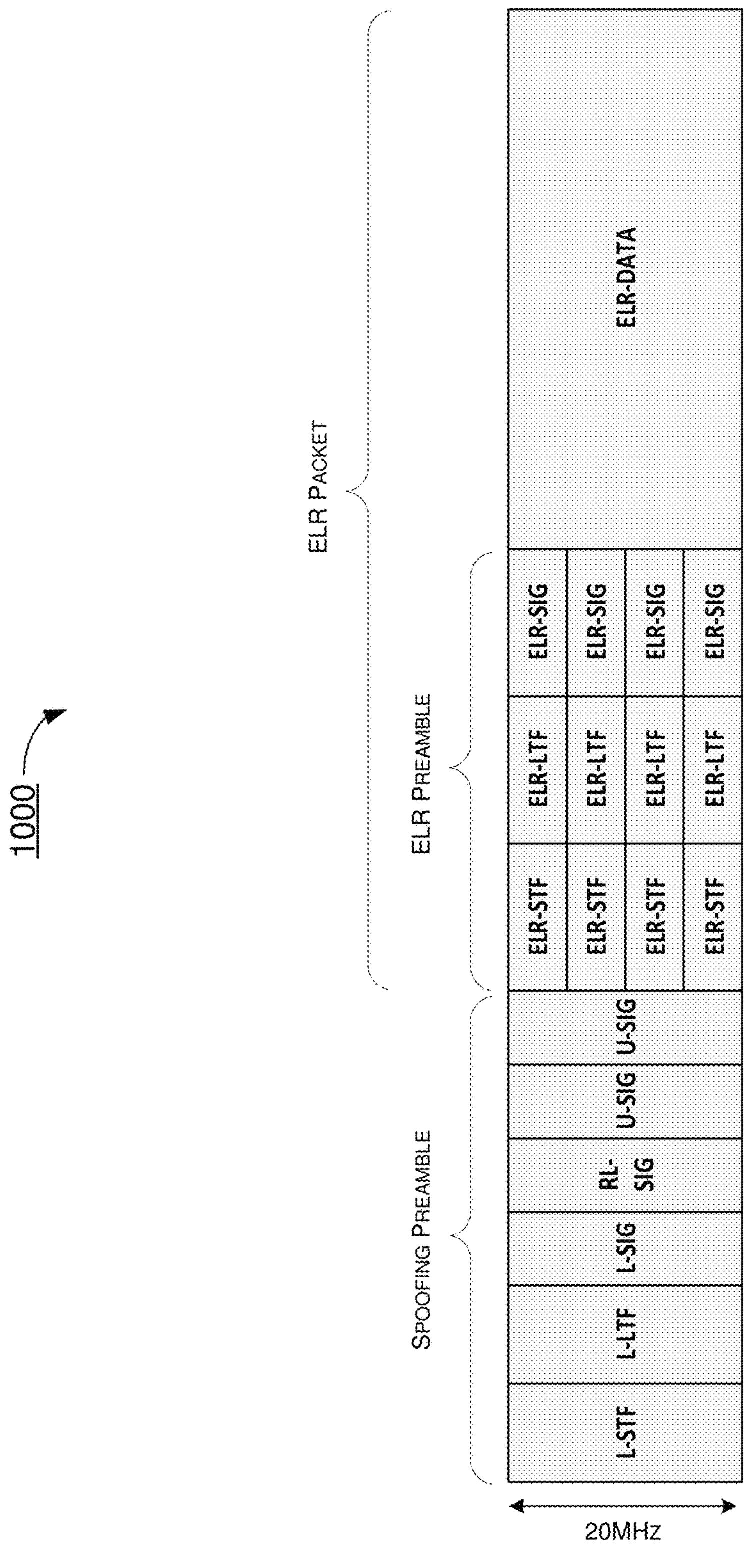
FIG. 10 is a diagram of an example design under a proposed scheme in accordance with the present disclosure.

FIG. 10 illustrates an example design 1000 under a proposed scheme in accordance with the present disclosure. Design 1000 may pertain to a PPDU for 5 MHz transmission in next-generation ELR WLANs under a second option (Option-2). In design 1000, the spoofing preamble and ELR preamble may be similar to the spoofing preamble and ELR preamble in design 900, respectively. Specifically, the ELR preamble may be transmitted and processed on a per-5 MHz subchannel duplication basis, with four times (4×) duplication, and the duration of the ELR preamble may be parameter dependent (e.g., dependent on ΔF and so on). On the other hand, the ELR-Data in design 1000 may be transmitted on the 20 MHz bandwidth without duplication. The IEEE 802.11ax/be tone plan may be utilized for ELR-Data, and orthogonal frequency-division multiple-access (OFDMA) multiple users may be supported.

Figure 11:
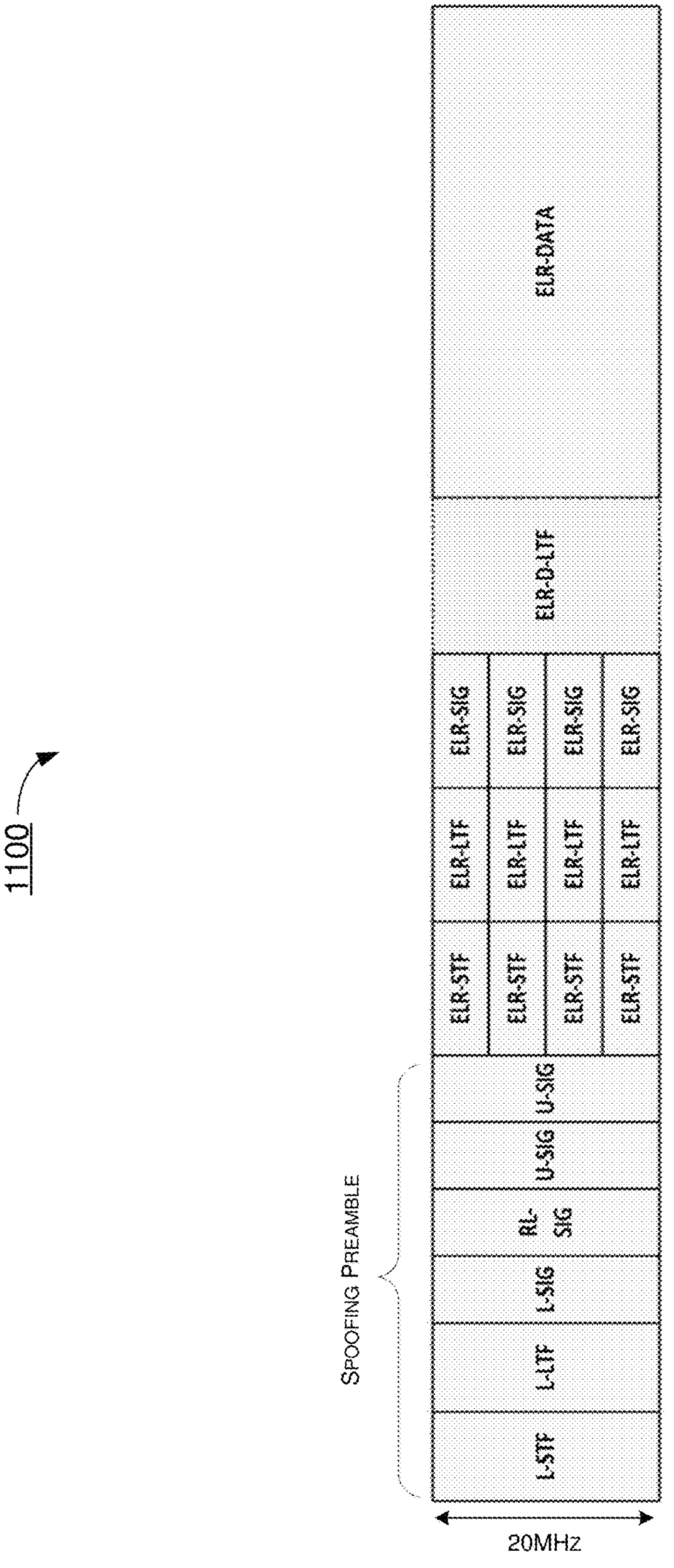
FIG. 11 is a diagram of an example design under a proposed scheme in accordance with the present disclosure.

FIG. 11 illustrates an example design 1100 under a proposed scheme in accordance with the present disclosure. Design 1100 may pertain to a PPDU for 5 MHz transmission in next-generation ELR WLANs under a third option (Option-3). In design 1100, the spoofing preamble and ELR preamble may be similar to the spoofing preamble and ELR preamble in design 1000, respectively. That is, the ELR-STF, ELR-LTF and ELR-SIG may be transmitted and processed on a per-5 MHz subchannel duplication basis, with four times (4×) duplication, and the duration of ELR-STF, ELR-LTF and ELR-SIG may be parameter dependent (e.g., dependent on ΔF and so on). Design 1100 differs from design 1000 in that the PPDU in design 1100 may further include an ELR data long training field (ELR-D-LTF) between ELR-SIG and ELR-Data. The ELR-D-LTF and ELR-Data may be transmitted on the 20 MHz bandwidth without duplication. The IEEE 802.11ax/be 20 MHz high efficiency (HE) long training field (HE-LTF) or extremely-high-throughput (EHT) long training field (EHT-LTF) sequence may be reused for ELR-D-LTF. The IEEE 802.11ax/be tone plan may be utilized for ELR-D-LTF and ELR-Data, and OFDMA multiple users may be supported.

Figure 12:
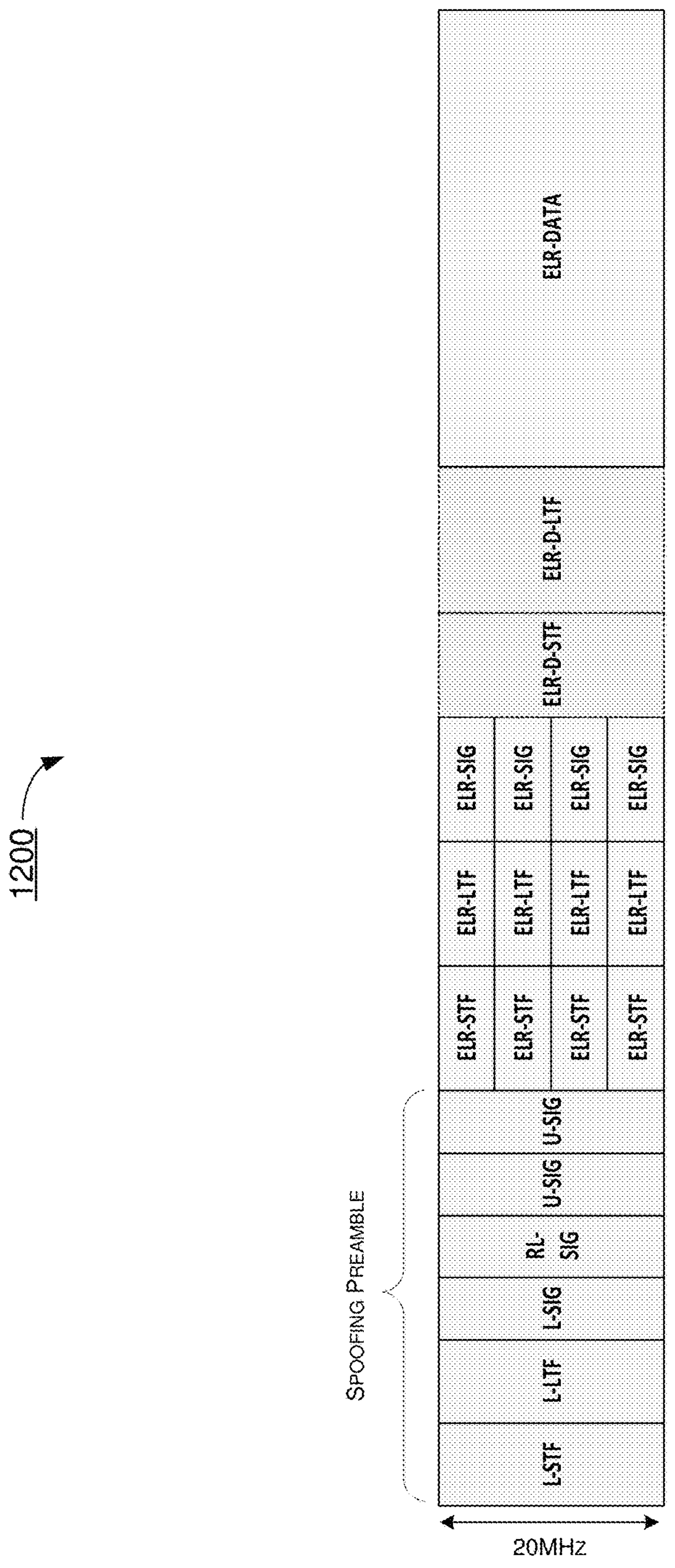
FIG. 12 is a diagram of an example design under a proposed scheme in accordance with the present disclosure.

FIG. 12 illustrates an example design 1200 under a proposed scheme in accordance with the present disclosure. Design 1200 may pertain to a PPDU for 5 MHz transmission in next-generation ELR WLANs under a fourth option (Option-4). In design 1200, the spoofing preamble and ELR preamble may be similar to the spoofing preamble and ELR preamble in design 1100, respectively. That is, the ELR-STF, ELR-LTF and ELR-SIG may be transmitted and processed on a per-5 MHz subchannel duplication basis, with four times (4×) duplication, and the duration of ELR-STF, ELR-LTF and ELR-SIG may be parameter dependent (e.g., dependent on ΔF and so on). Design 1200 differs from design 1100 in that the PPDU in design 1200 may further include an ELR data short training field (ELR-D-STF) between ELR-SIG and ELR-D-LTF. The ELR-D-STF, ELR-D-LTF and ELR-Data may be transmitted on the 20 MHz bandwidth without duplication. The IEEE 802.11ax/be 20 MHz HE short training field (HE-STF) or HE-LTF or EHT short training field (EHT-STF) or EHT-LTF sequence may be reused for ELR-D-STF and ELR-D-LTF, respectively. The IEEE 802.11ax/be tone plan may be utilized for ELR-D-STF, ELR-D-LTF and ELR-Data, and OFDMA multiple users may be supported. The addition of ELR-D-STF may aid more accurate automatic gain control (AGC) for an uplink trigger based (UL-TB) OFDMA operation.

Figure 13:
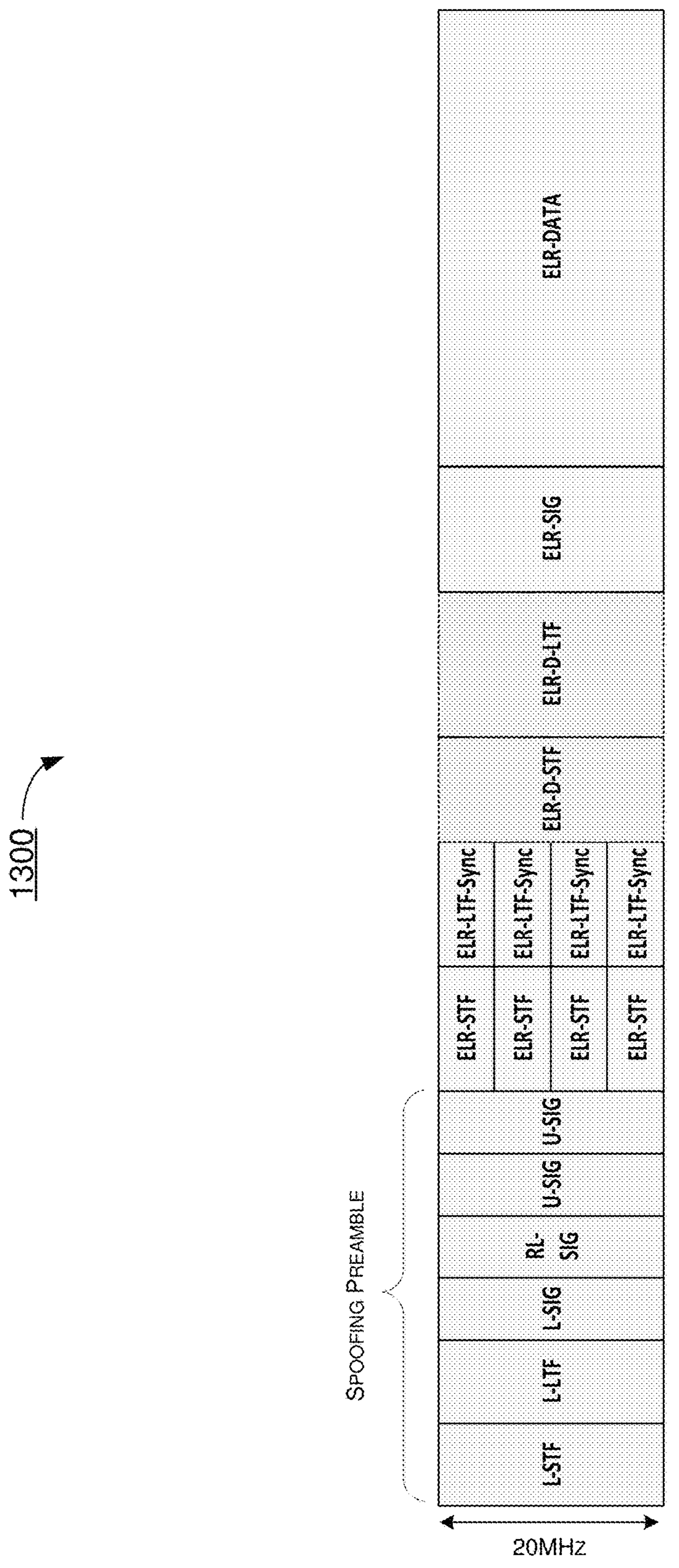
FIG. 13 is a diagram of an example design under a proposed scheme in accordance with the present disclosure.

FIG. 13 illustrates an example design 1300 under a proposed scheme in accordance with the present disclosure. Design 1300 may pertain to a PPDU for 5 MHz transmission in next-generation ELR WLANs under a fifth option (Option-5). In design 1300, the spoofing preamble may be similar to the spoofing preamble in design 1200. The ELR preamble may include certain fields such as ELR-STF, ELR-LTF synchronization (ELR-LTF-Sync), ELR-D-STF, ELR-D-LTF and ELR-SIG. The addition of ELR-LTF-Sync symbols may enhance time and frequency synchronization. Moreover, the ELR-STF and ELR-LTF-Sync may be transmitted and processed on a per-5 MHz subchannel duplication basis, with four times (4×) duplication, and the duration of ELR-STF and ELR-LTF-Sync may be parameter dependent (e.g., dependent on ΔF and so on). Design 1300 differs from design 1200 in that the ELR-SIG field may be between the ELR-D-LTF and ELR-Data, and the ELR-SIG may be transmitted on the 20 MHz bandwidth. The ELR-D-STF, ELR-D-LTF, ELR-SIG and ELR-Data may be transmitted on the 20 MHz bandwidth without duplication. The IEEE 802.11ax/be 20 MHz HE-STF/HE-LTF or EHT-STF/EHT-LTF sequence may be reused for ELR-D-STF and ELR-D-LTF, respectively. The IEEE 802.11ax/be tone plan may be utilized for ELR-D-STF, ELR-D-LTF, ELR-SIG and ELR-Data, and OFDMA multiple users may be supported. The existence of ELR-D-STF may aid more accurate AGC for an UL-TB OFDMA operation. In design 1300, RU duplication or other effective low-coding-rate schemes may be utilized for ELR-SIG to achieve robust reception by a receiving entity.

Figure 14:
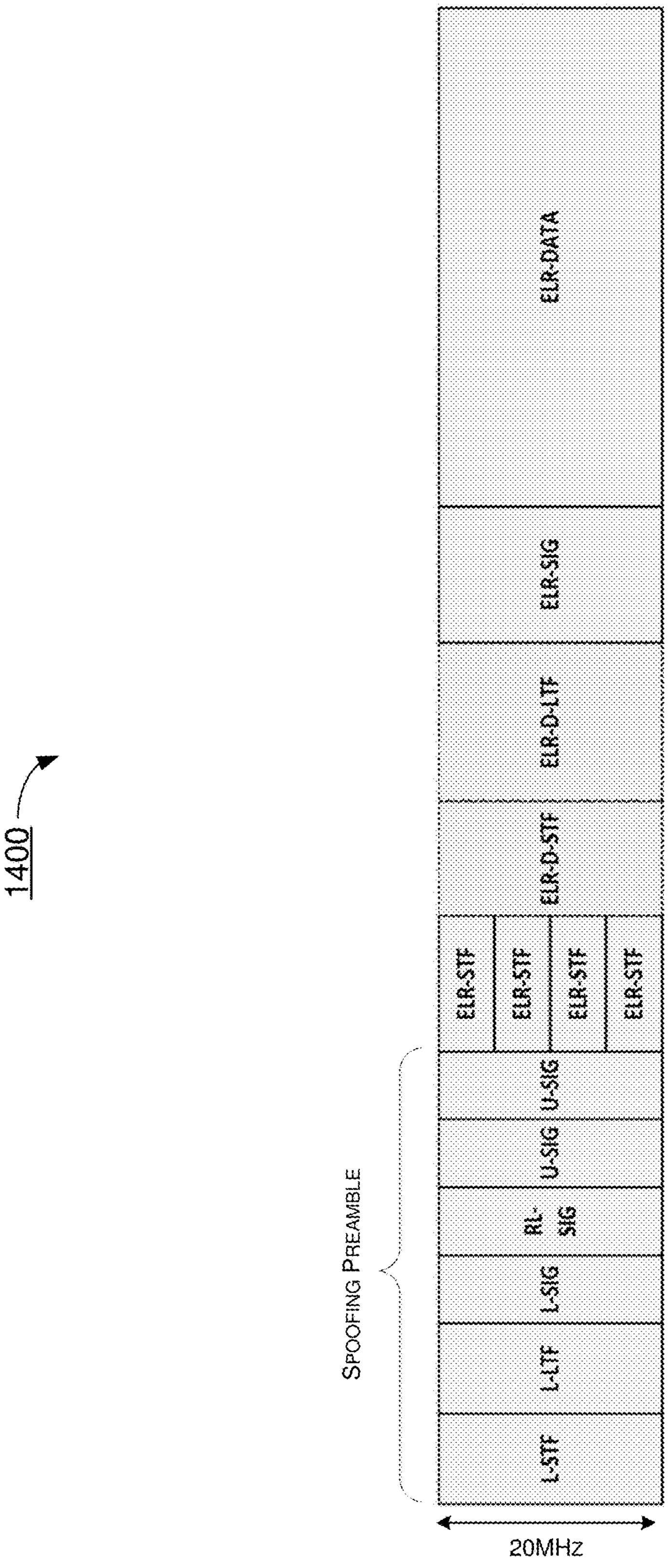
FIG. 14 is a diagram of an example design under a proposed scheme in accordance with the present disclosure.

FIG. 14 illustrates an example design 1400 under a proposed scheme in accordance with the present disclosure. Design 1400 may pertain to a PPDU for 5 MHz transmission in next-generation ELR WLANs under a sixth option (Option-6). In design 1400, the spoofing preamble may be similar to the spoofing preamble in design 1300. The ELR preamble may include certain fields such as ELR-STF, ELR-D-STF, ELR-D-LTF and ELR-SIG. The ELR-STF may be transmitted and processed on a per-5 MHz subchannel duplication basis, with four times (4×) duplication, and the duration of ELR-STF may be parameter dependent (e.g., dependent on ΔF and so on). Design 1400 differs from design 1300 in that there is no ELR-LTF-Sync field in the ELR preamble. The ELR-D-STF, ELR-D-LTF, ELR-SIG and ELR-Data may be transmitted on the 20 MHz bandwidth without duplication. The IEEE 802.11ax/be 20 MHz HE-STF/HE-LTF or EHT-STF/EHT-LTF sequence may be reused for ELR-D-STF and ELR-D-LTF, respectively. The IEEE 802.11ax/be tone plan may be utilized for ELR-D-STF, ELR-D-LTF, ELR-SIG and ELR-Data, and OFDMA multiple users may be supported. The existence of ELR-D-STF may aid more accurate AGC for an UL-TB OFDMA operation. In design 1400, RU duplication or other effective low-coding-rate schemes may be utilized for ELR-SIG to achieve robust reception by a receiving entity.

Figure 15:
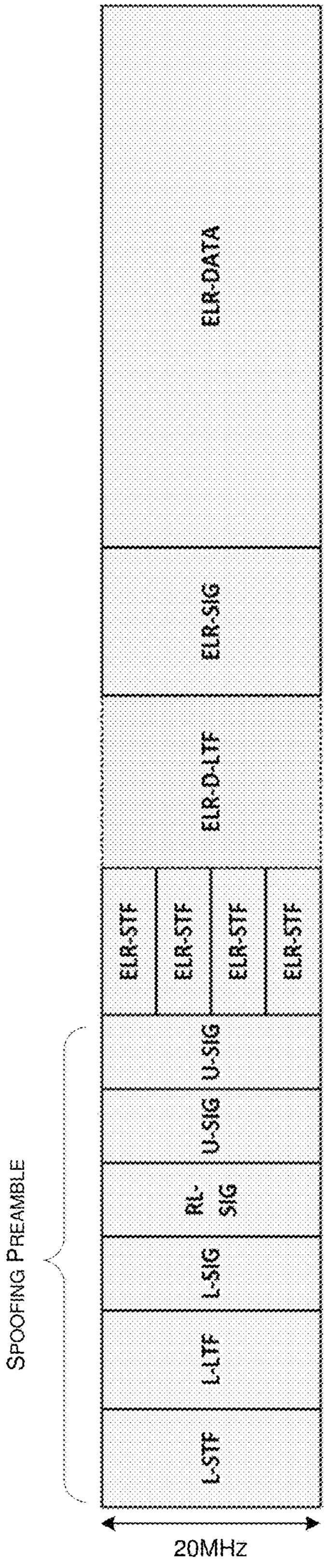
FIG. 15 is a diagram of an example design under a proposed scheme in accordance with the present disclosure.

FIG. 15 illustrates an example design 1500 under a proposed scheme in accordance with the present disclosure. Design 1500 may pertain to a PPDU for 5 MHz transmission in next-generation ELR WLANs under a seventh option (Option-7). In design 1500, the spoofing preamble may be similar to the spoofing preamble in design 1400. The ELR preamble may include certain fields such as ELR-STF, ELR-D-LTF and ELR-SIG. The ELR-STF may be transmitted and processed on a per-5 MHz subchannel duplication basis, with four times (4×) duplication, and the duration of ELR-STF may be parameter dependent (e.g., dependent on ΔF and so on). Design 1500 differs from design 1400 in that there is no ELR-D-STF field in the PPDU. The ELR-D-LTF, ELR-SIG and ELR-Data may be transmitted on the 20 MHz bandwidth without duplication. The IEEE 802.11ax/be 20 MHz HE-LTF or EHT-LTF sequence may be reused for ELR-D-LTF. The IEEE 802.11ax/be tone plan may be utilized for ELR-D-LTF, ELR-SIG and ELR-Data, and OFDMA multiple users may be supported. In design 1500, RU duplication or other effective low-coding-rate schemes may be utilized for ELR-SIG to achieve robust reception by a receiving entity.

Figure 16:
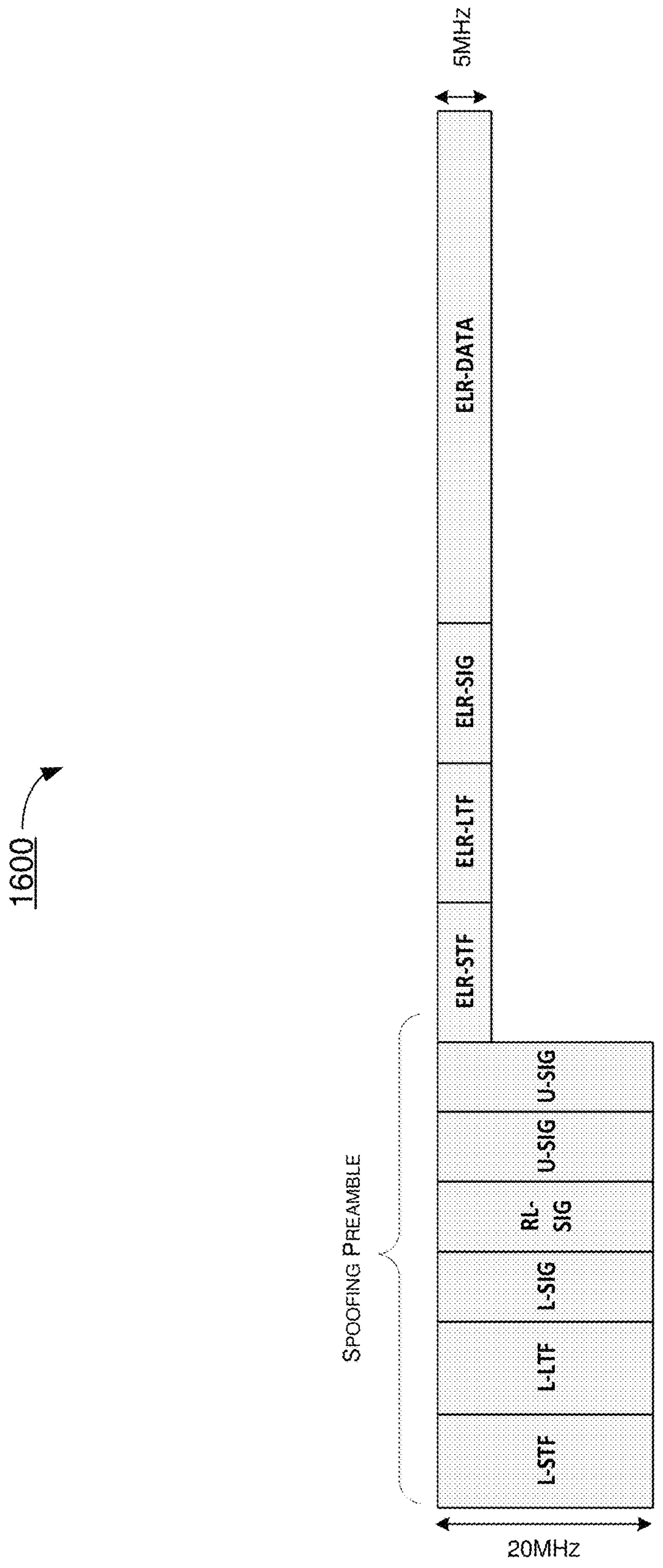
FIG. 16 is a diagram of an example design under a proposed scheme in accordance with the present disclosure.

FIG. 16 illustrates an example design 1600 under a proposed scheme in accordance with the present disclosure. Design 1600 may pertain to a PPDU for 5 MHz transmission in next-generation ELR WLANs under an eighth option (Option-8). In design 1600, the spoofing preamble may be similar to the spoofing preamble in design 1500. The ELR preamble may include certain fields such as ELR-STF, ELR-LTF and ELR-SIG. The ELR preamble may be transmitted and processed on one 5 MHz subchannel without duplication, and the duration of the ELR preamble may be parameter dependent (e.g., dependent on ΔF and so on). Design 1600 differs from design 900 in that both the ELR preamble and ELR-Data in design 1600 may be transmitted on one narrow bandwidth 5 MHz subchannel without duplication. In some regions and countries, such as the United States (US), narrow bandwidths may be beneficial for higher power per tone. However, in some other regions and countries, such as the European Union (EU), the maximum transmission power may be limited by the power spectral density (PSD) requirement.

Under various proposed schemes in accordance with the present disclosure with respect to narrow bandwidths 2.5 MHz and 10 MHz for ELR PPDU, the same design considerations and design options of narrow bandwidth 5 MHz-based ELR PPDU described above may be extended to narrow bandwidths 2.5 MHz and 10 MHz. For BW=2.5 MHz, either subcarrier frequency spacing=78.125 KHz (e.g., $N_{fft}$=32) or 39.0625 kHz (e.g., $N_{fft}$=64) may be applied. The number of symbols for L-STF, L-LTF, L-LTF-Sync, ELR-D-STF, ELR-D-LTF and ELR-SIG may yet to be determined.

Figure 17:
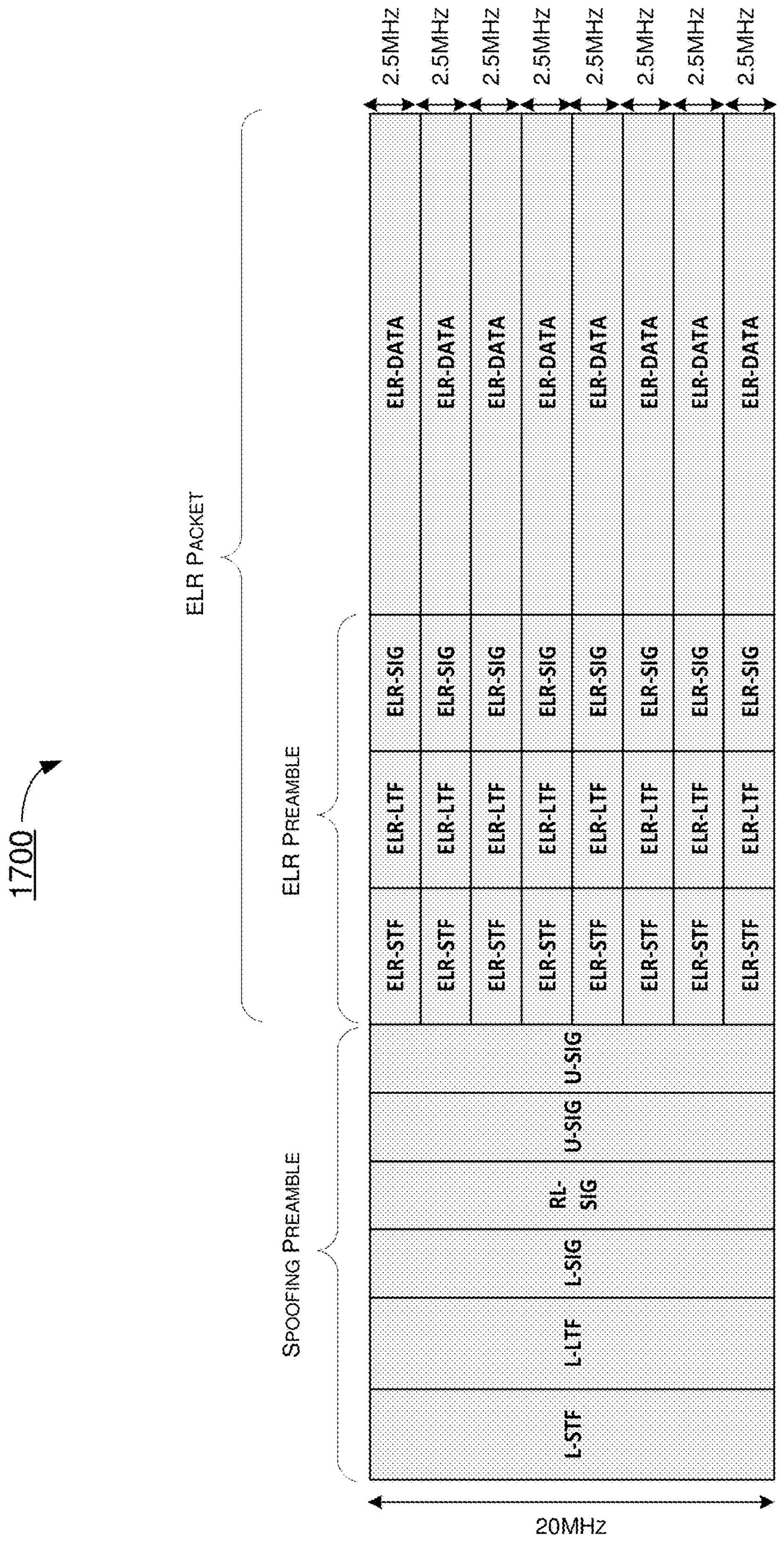
FIG. 17 is a diagram of an example design under a proposed scheme in accordance with the present disclosure.

FIG. 17 illustrates an example design 1700 under a proposed scheme in accordance with the present disclosure. Design 1700 may pertain to a PPDU for 2.5 MHz transmission in next-generation ELR WLANs under a first option (Option-1). Referring to FIG. 17, a PPDU transmitted in a 20 MHz bandwidth under Option-1 may include a spoofing preamble and an ELR packet including ELR preamble and ELR-Data. The spoofing preamble may include certain fields such as L-STF, L-LTF, L-SIG, RL-SIG, U-SIG and another U-SIG. Contents of the spoofing preamble may be transmitted on the 20 MHz bandwidth. For simplicity and to avoid redundancy, listing of the fields in the spoofing preamble will not be repeated in other designs described below. The ELR preamble may include certain fields such as ELR-STF, ELR-LTF and ELR-SIG. The duration of ELR-STF and ELR-LTF may be parameter dependent (e.g., dependent on ΔF and so on). Contents of the ELR packet may be transmitted and processed on a per-2.5 MHz subchannel non-HT duplication basis, which may aid ELR packet detection on the receiving end. That is, transmission of the ELR packet may involve low coding rate for ELR-SIG and ELR-Data, DCM) and tone repetition. The per-2.5 MHz subchannel non-HT duplication (eight times (8×) duplication) may support multiple users by assigning each user to one or more different subchannels.

It is noteworthy that, for BW=2.5 MHZ, the subcarrier frequency spacing (SCS or ΔF) may be either 78.125 kHz (e.g., $N_{fft}$=32) or 39.0625 kHz (e.g., $N_{fft}$=64). The SCS or ΔF of 78.125 kHz or 39.0625 kHz may be applied on all the 2.5 MHz bandwidth ELR design options in other designs described below.

Figure 18:
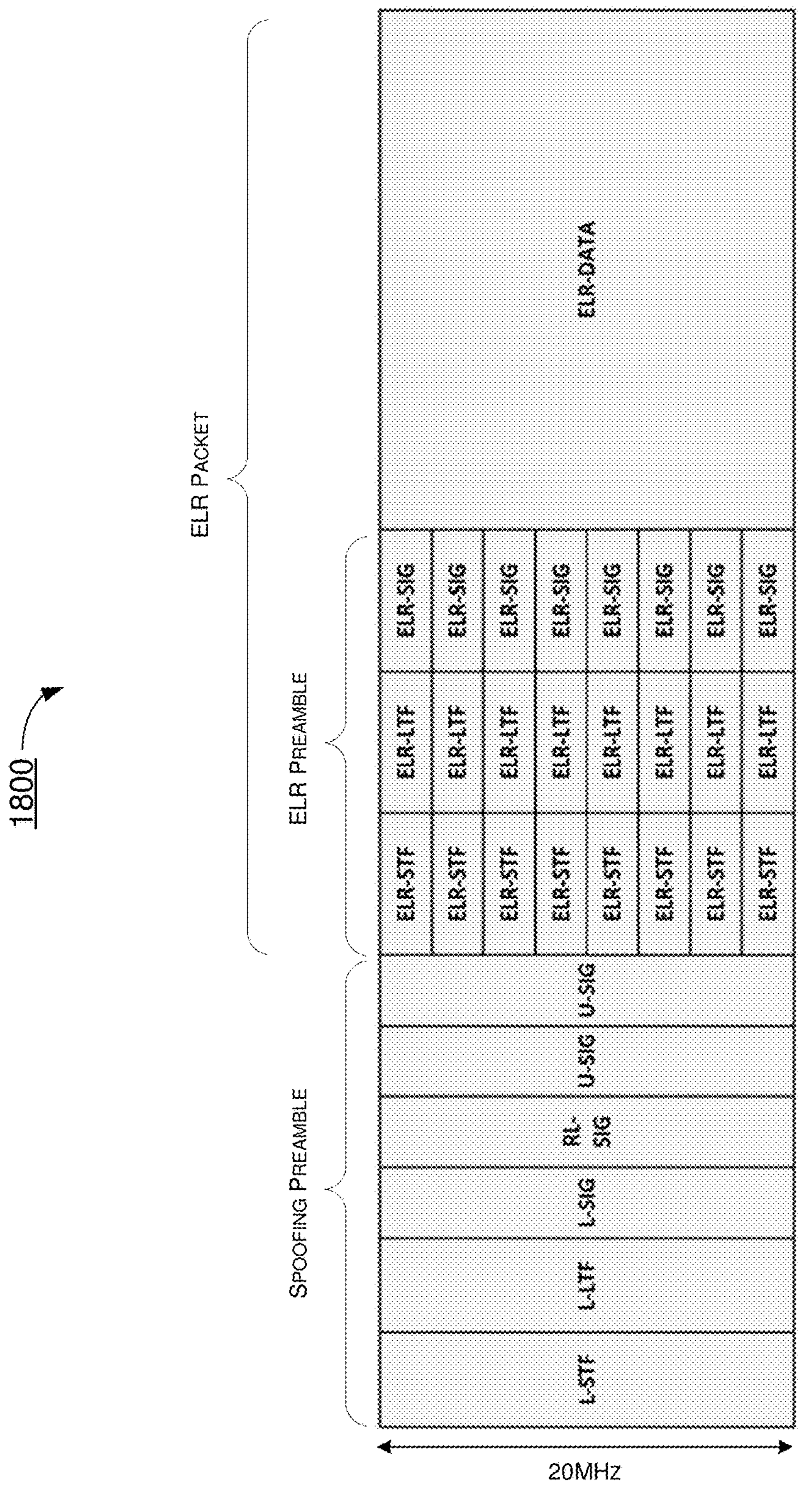
FIG. 18 is a diagram of an example design under a proposed scheme in accordance with the present disclosure.

FIG. 18 illustrates an example design 1800 under a proposed scheme in accordance with the present disclosure. Design 1800 may pertain to a PPDU for 2.5 MHz transmission in next-generation ELR WLANs under a second option (Option-2). In design 1800, the spoofing preamble and ELR preamble may be similar to the spoofing preamble and ELR preamble in design 1700, respectively. Specifically, the ELR preamble may be transmitted and processed on a per-2.5 MHz subchannel duplication basis, with eight times (8×) duplication, and the duration of the ELR preamble may be parameter dependent (e.g., dependent on ΔF and so on). On the other hand, the ELR-Data in design 1800 may be transmitted on the 20 MHz bandwidth without duplication. The IEEE 802.11ax/be tone plan may be utilized for ELR-Data, and OFDMA multiple users may be supported.

Figure 19:
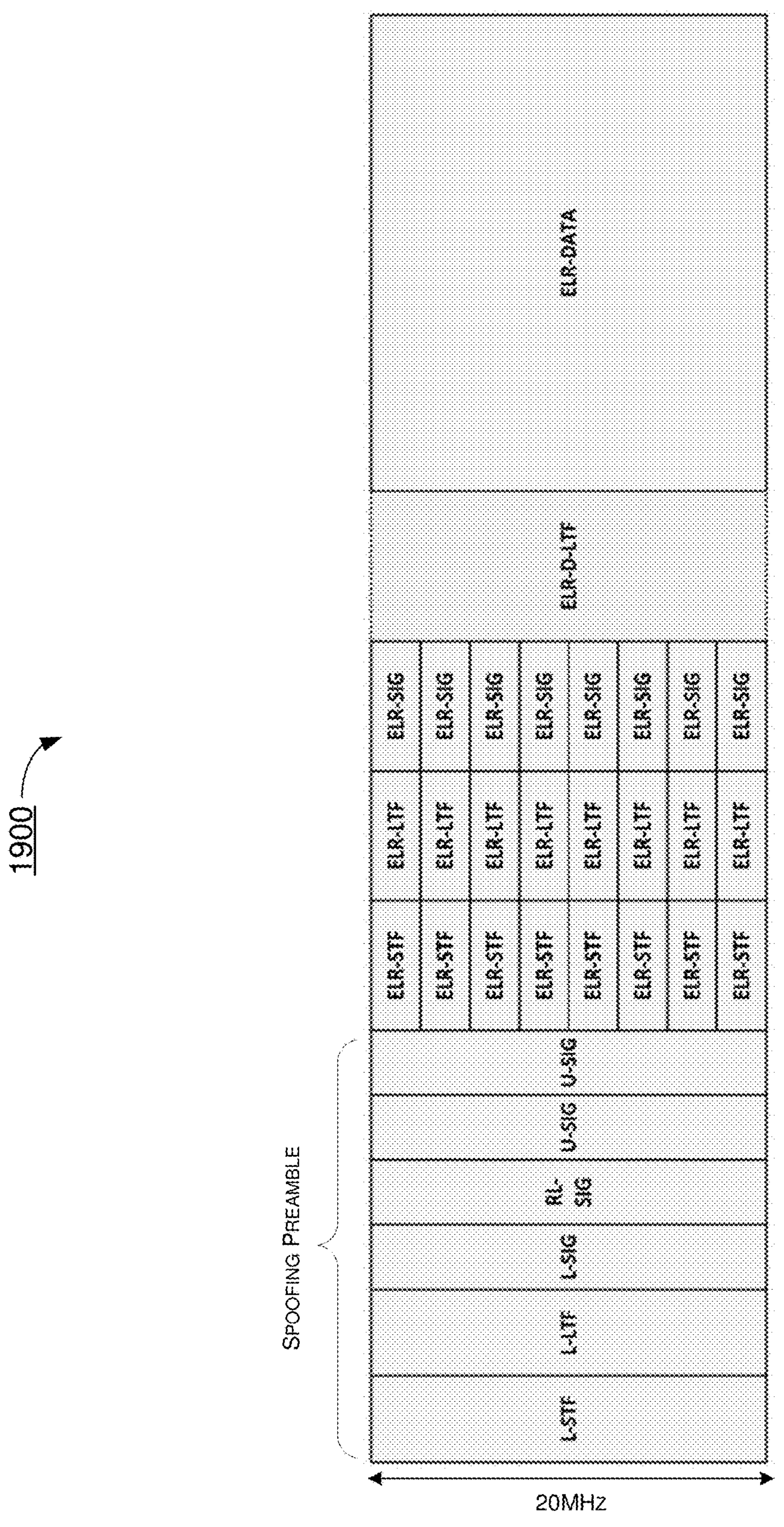
FIG. 19 is a diagram of an example design under a proposed scheme in accordance with the present disclosure.

FIG. 19 illustrates an example design 1900 under a proposed scheme in accordance with the present disclosure. Design 1900 may pertain to a PPDU for 2.5 MHz transmission in next-generation ELR WLANs under a third option (Option-3). In design 1900, the spoofing preamble and ELR preamble may be similar to the spoofing preamble and ELR preamble in design 1800, respectively. That is, the ELR-STF, ELR-LTF and ELR-SIG may be transmitted and processed on a per-2.5 MHz subchannel duplication basis, with eight times (8×) duplication, and the duration of ELR-STF, ELR-LTF and ELR-SIG may be parameter dependent (e.g., dependent on ΔF and so on). Design 1900 differs from design 1800 in that the PPDU in design 1900 may further include an ELR-D-LTF between ELR-SIG and ELR-Data. The ELR-D-LTF and ELR-Data may be transmitted on the 20 MHz bandwidth without duplication. The IEEE 802.11ax/be 20 MHz HE-LTF or EHT-LTF sequence may be reused for ELR-D-LTF. The IEEE 802.11ax/be tone plan may be utilized for ELR-D-LTF and ELR-Data, and OFDMA multiple users may be supported.

Figure 20:
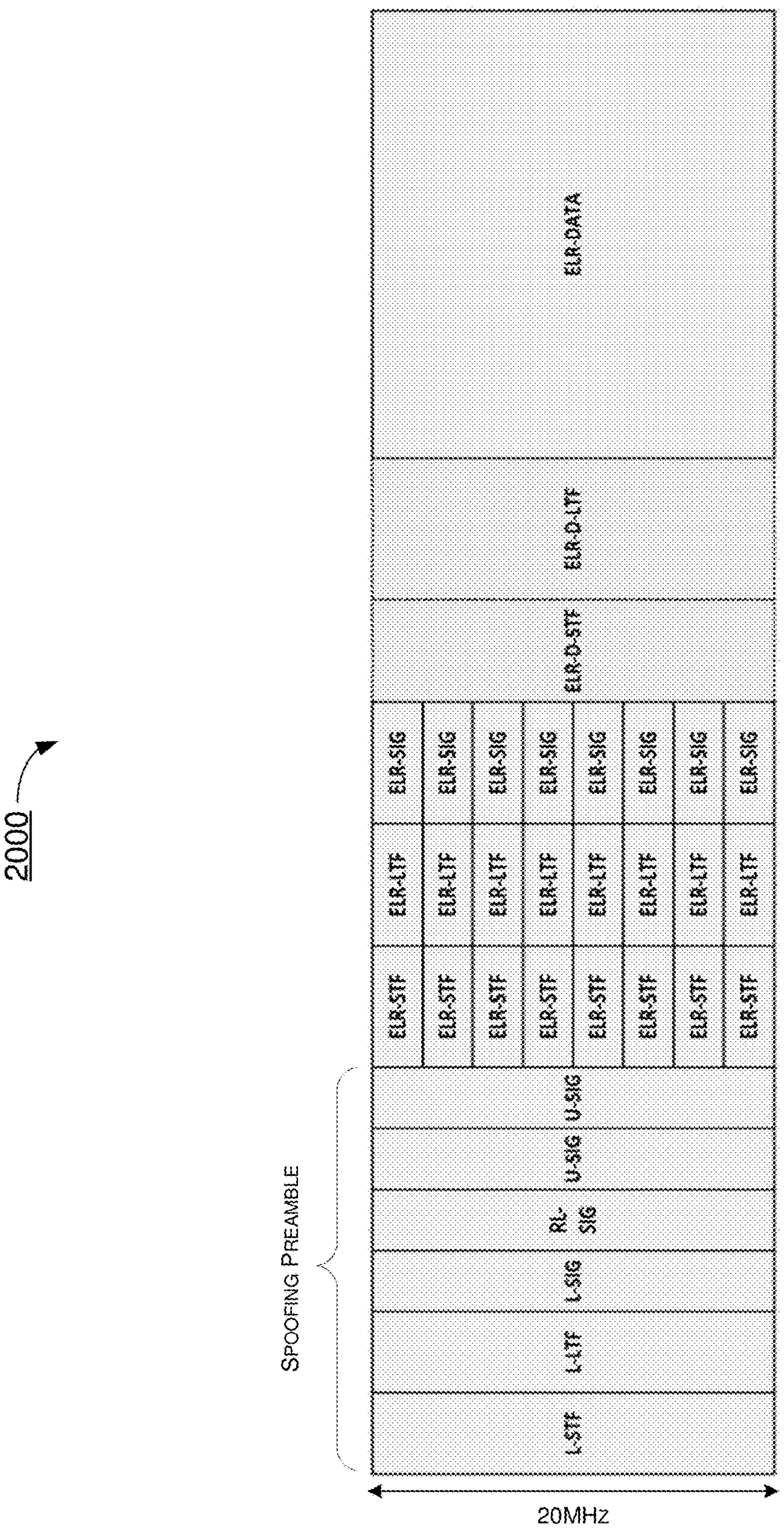
FIG. 20 is a diagram of an example design under a proposed scheme in accordance with the present disclosure.

FIG. 20 illustrates an example design 2000 under a proposed scheme in accordance with the present disclosure. Design 2000 may pertain to a PPDU for 2.5 MHz transmission in next-generation ELR WLANs under a fourth option (Option-4). In design 2000, the spoofing preamble and ELR preamble may be similar to the spoofing preamble and ELR preamble in design 1900, respectively. That is, the ELR-STF, ELR-LTF and ELR-SIG may be transmitted and processed on a per-2.5 MHz subchannel duplication basis, with eight times (8×) duplication, and the duration of ELR-STF, ELR-LTF and ELR-SIG may be parameter dependent (e.g., dependent on ΔF and so on). Design 2000 differs from design 1900 in that the PPDU in design 2000 may further include an ELR-D-STF between ELR-SIG and ELR-D-LTF. The ELR-D-STF, ELR-D-LTF and ELR-Data may be transmitted on the 20 MHz bandwidth without duplication. The IEEE 802.11ax/be 20 MHz HE-STF/HE-LTF or EHT-STF/EHT-LTF sequence may be reused for ELR-D-STF and ELR-D-LTF, respectively. The IEEE 802.11ax/be tone plan may be utilized for ELR-D-STF, ELR-D-LTF and ELR-Data, and OFDMA multiple users may be supported. The addition of ELR-D-STF may aid more accurate AGC for an UL-TB OFDMA operation.

Figure 21:
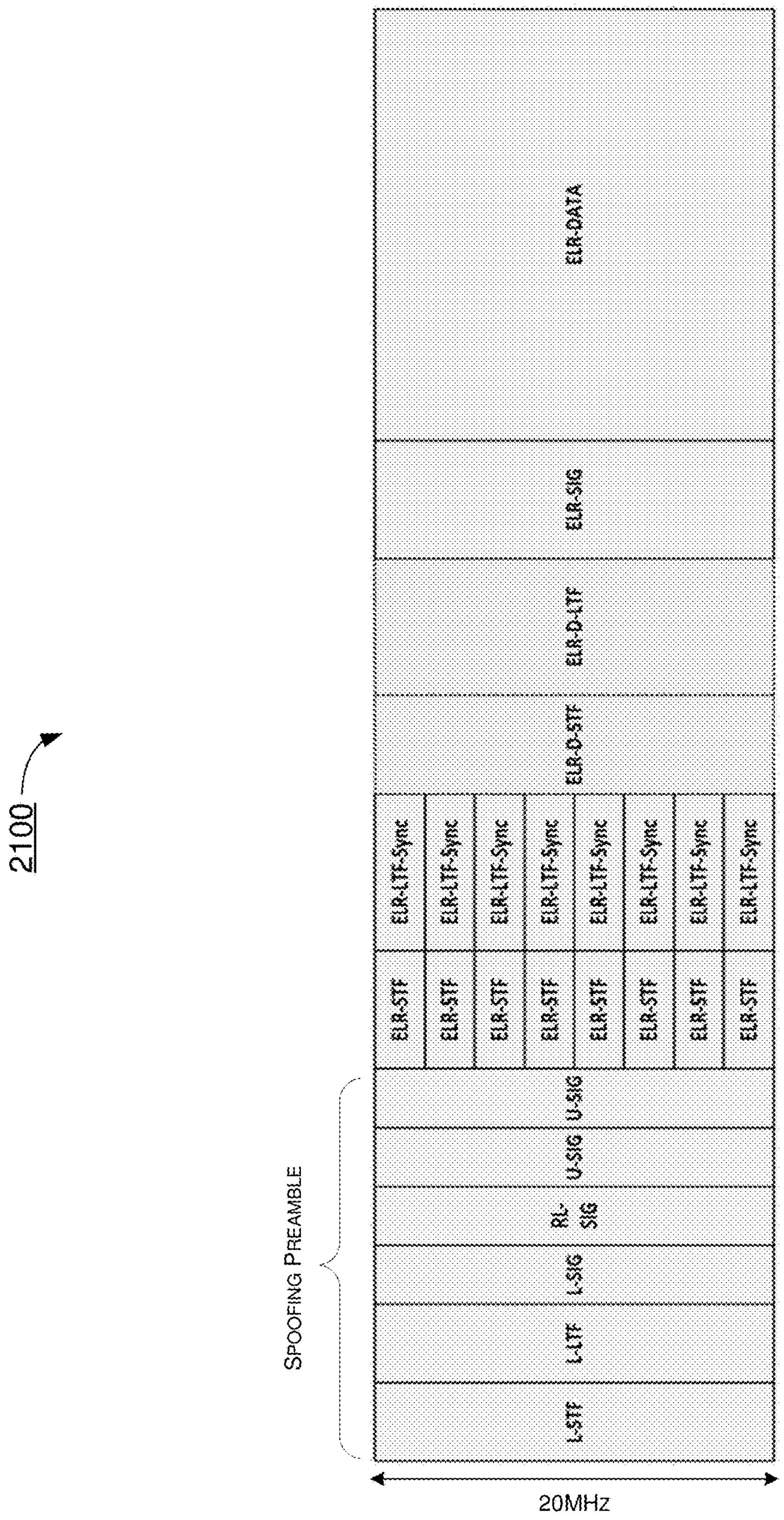
FIG. 21 is a diagram of an example design under a proposed scheme in accordance with the present disclosure.

FIG. 21 illustrates an example design 2100 under a proposed scheme in accordance with the present disclosure. Design 2100 may pertain to a PPDU for 2.5 MHz transmission in next-generation ELR WLANs under a fifth option (Option-5). In design 2100, the spoofing preamble may be similar to the spoofing preamble in design 2000. The ELR preamble may include certain fields such as ELR-STF, ELR-LTF-Sync, ELR-D-STF, ELR-D-LTF and ELR-SIG. The addition of ELR-LTF-Sync symbols may enhance time and frequency synchronization. Moreover, the ELR-STF and ELR-LTF-Sync may be transmitted and processed on a per-2.5 MHz subchannel duplication basis, with eight times (8×) duplication, and the duration of ELR-STF and ELR-LTF-Sync may be parameter dependent (e.g., dependent on ΔF and so on). Design 2100 differs from design 2000 in that the ELR-SIG field may be between the ELR-D-LTF and ELR-Data, and the ELR-SIG may be transmitted on the 20 MHz bandwidth. The ELR-D-STF, ELR-D-LTF, ELR-SIG and ELR-Data may be transmitted on the 20 MHz bandwidth without duplication. The IEEE 802.11ax/be 20 MHz HE-STF/HE-LTF or EHT-STF/EHT-LTF sequence may be reused for ELR-D-STF and ELR-D-LTF, respectively. The IEEE 802.11ax/be tone plan may be utilized for ELR-D-STF, ELR-D-LTF, ELR-SIG and ELR-Data, and OFDMA multiple users may be supported. The existence of ELR-D-STF may aid more accurate AGC for an UL-TB OFDMA operation. In design 2100, RU duplication or other effective low-coding-rate schemes may be utilized for ELR-SIG to achieve robust reception by a receiving entity.

Figure 22:
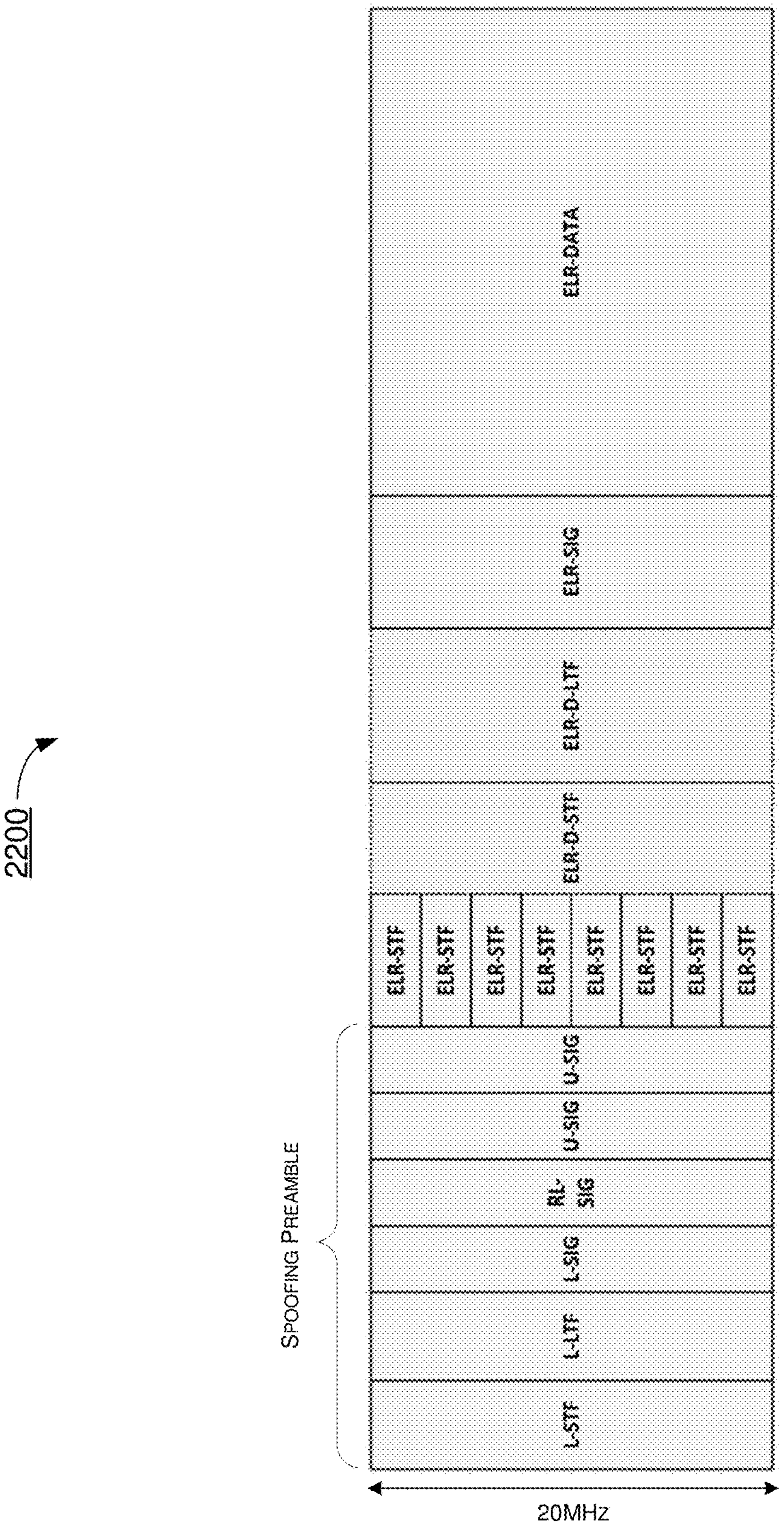
FIG. 22 is a diagram of an example design under a proposed scheme in accordance with the present disclosure.

FIG. 22 illustrates an example design 2200 under a proposed scheme in accordance with the present disclosure.

Design 2200 may pertain to a PPDU for 2.5 MHz transmission in next-generation ELR WLANs under a sixth option (Option-6). In design 2200, the spoofing preamble may be similar to the spoofing preamble in design 2100. The ELR preamble may include certain fields such as ELR-STF, ELR-D-STF, ELR-D-LTF and ELR-SIG. The ELR-STF may be transmitted and processed on a per-2.5 MHz subchannel duplication basis, with eight times (8×) duplication, and the duration of ELR-STF may be parameter dependent (e.g., dependent on ΔF and so on). Design 2200 differs from design 2100 in that there is no ELR-LTF-Sync field in the ELR preamble. The ELR-D-STF, ELR-D-LTF, ELR-SIG and ELR-Data may be transmitted on the 20 MHz bandwidth without duplication. The IEEE 802.11ax/be 20 MHz HE-STF/HE-LTF or EHT-STF/EHT-LTF sequence may be reused for ELR-D-STF and ELR-D-LTF, respectively. The IEEE 802.11ax/be tone plan may be utilized for ELR-D-STF, ELR-D-LTF, ELR-SIG and ELR-Data, and OFDMA multiple users may be supported. The existence of ELR-D-STF may aid more accurate AGC for an UL-TB OFDMA operation. In design 2200, RU duplication or other effective low-coding-rate schemes may be utilized for ELR-SIG to achieve robust reception by a receiving entity.

Figure 23:
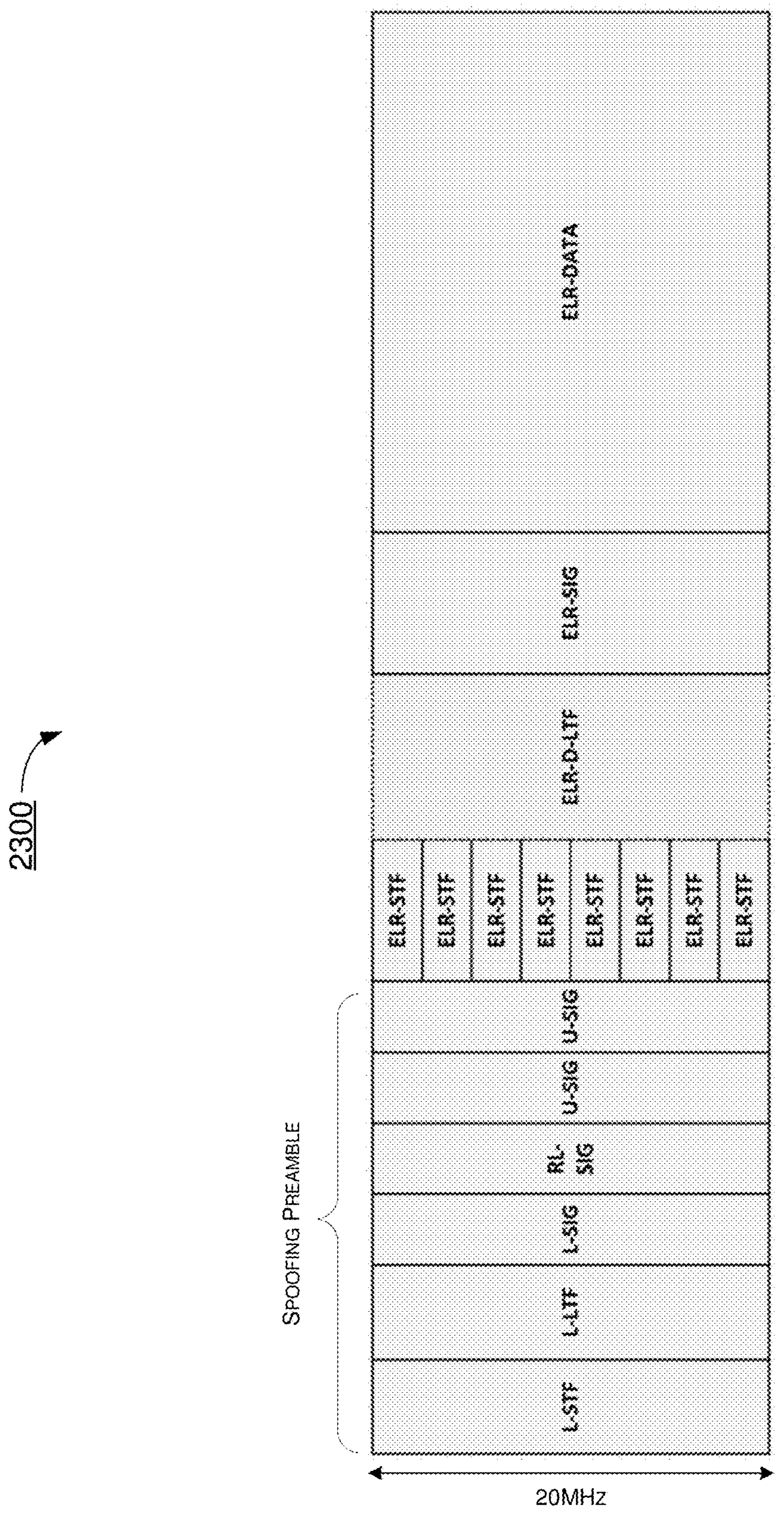
FIG. 23 is a diagram of an example design under a proposed scheme in accordance with the present disclosure.

FIG. 23 illustrates an example design 2300 under a proposed scheme in accordance with the present disclosure. Design 2300 may pertain to a PPDU for 2.5 MHz transmission in next-generation ELR WLANs under a seventh option (Option-7). In design 2300, the spoofing preamble may be similar to the spoofing preamble in design 2200. The ELR preamble may include certain fields such as ELR-STF, ELR-D-LTF and ELR-SIG. The ELR-SIG may be transmitted and processed on a per-2.5 MHz subchannel duplication basis, with eight times (8×) duplication, and the duration of ELR-SIG may be parameter dependent (e.g., dependent on ΔF and so on). Design 2300 differs from design 2200 in that there is no ELR-D-STF field in the PPDU. The ELR-D-LTF, ELR-SIG and ELR-Data may be transmitted on the 20 MHz bandwidth without duplication. The IEEE 802.11ax/be 20 MHz HE-LTF or EHT-LTF sequence may be reused for ELR-D-LTF. The IEEE 802.11ax/be tone plan may be utilized for ELR-D-LTF, ELR-SIG and ELR-Data, and OFDMA multiple users may be supported. In design 2300, RU duplication or other effective low-coding-rate schemes may be utilized for ELR-SIG to achieve robust reception by a receiving entity. It is noteworthy that, since ELR-SIG is transmitted/processed per 2.5 MHz subchannel, which roughly corresponds to a 26-tone resource unit (RU26) of IEEE 802.11ax/be occupying bandwidth, the ELR-D-STF may not be necessary for both downlink (DL) and uplink (UL) (or even UL TB PPDU with OFDMA).

Figure 24:
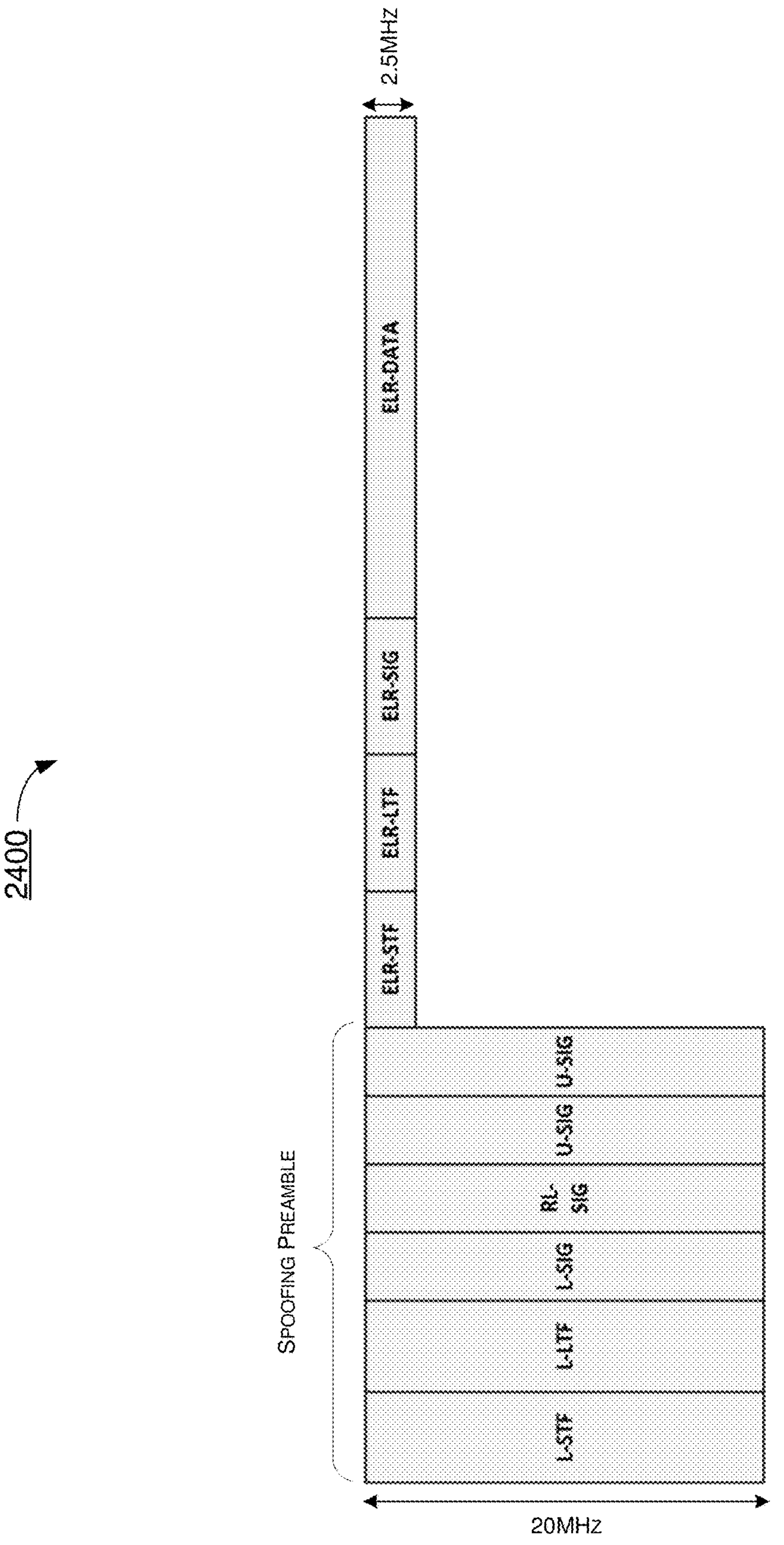
FIG. 24 is a diagram of an example design under a proposed scheme in accordance with the present disclosure.

FIG. 24 illustrates an example design 2400 under a proposed scheme in accordance with the present disclosure. Design 2400 may pertain to a PPDU for 2.5 MHz transmission in next-generation ELR WLANs under an eighth option (Option-8). In design 2400, the spoofing preamble may be similar to the spoofing preamble in design 2300. The ELR preamble may include certain fields such as ELR-STF, ELR-LTF and ELR-SIG. The ELR preamble may be transmitted and processed on one 2.5 MHz subchannel without duplication, and the duration of the ELR preamble may be parameter dependent (e.g., dependent on ΔF and so on). Design 2400 differs from design 1700 in that both the ELR preamble and ELR-Data in design 2400 may be transmitted on one narrow bandwidth 2.5 MHz subchannel without duplication. In some regions and countries, such as the US, narrow bandwidths may be beneficial for higher power per tone. However, in some other regions and countries, such as the EU, the maximum transmission power may be limited by the PSD requirement.

Figure 25:
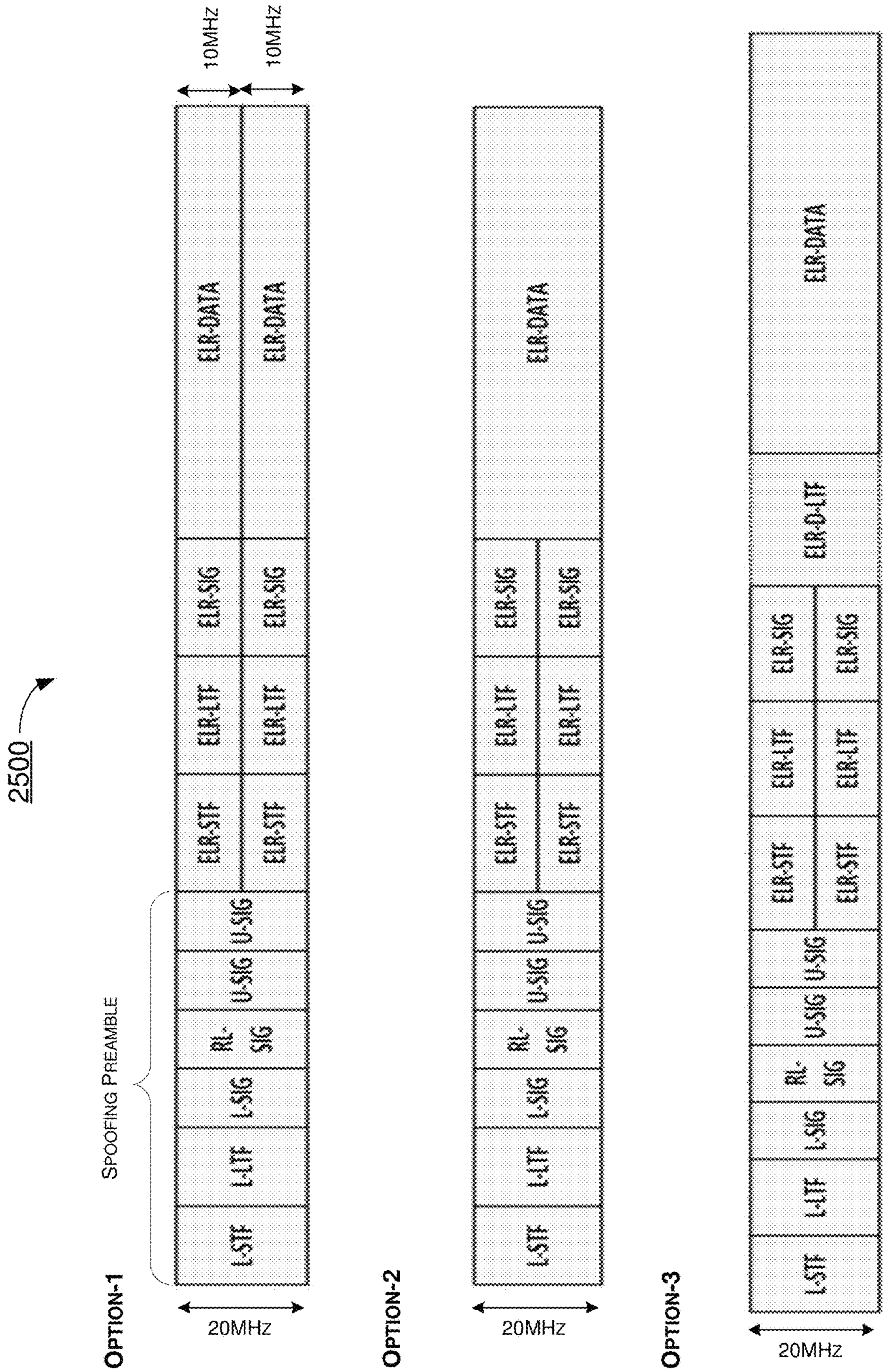
FIG. 25 is a diagram of an example design under a proposed scheme in accordance with the present disclosure.
Figure 26:
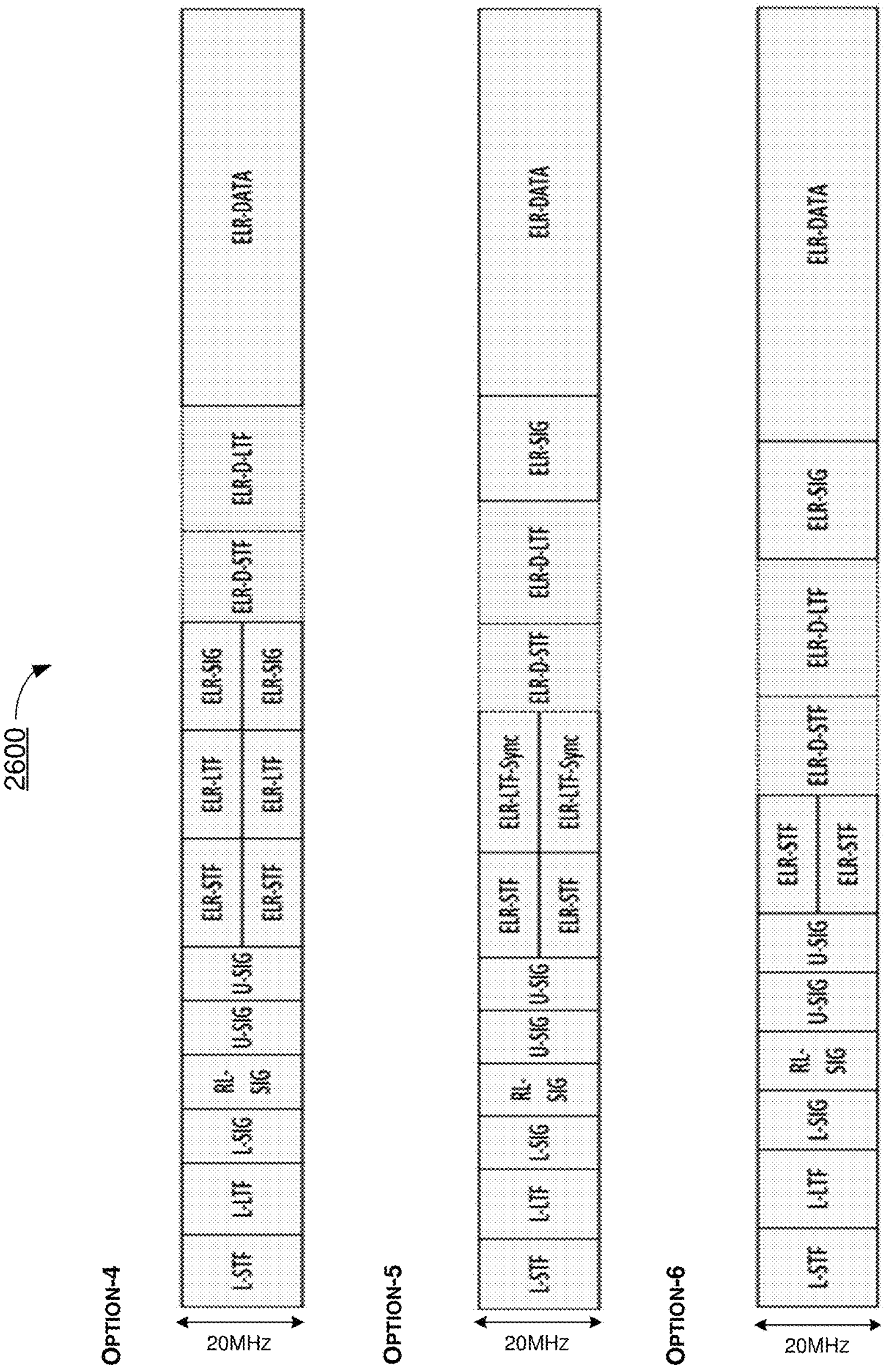
FIG. 26 is a diagram of an example design under a proposed scheme in accordance with the present disclosure.
Figure 27:
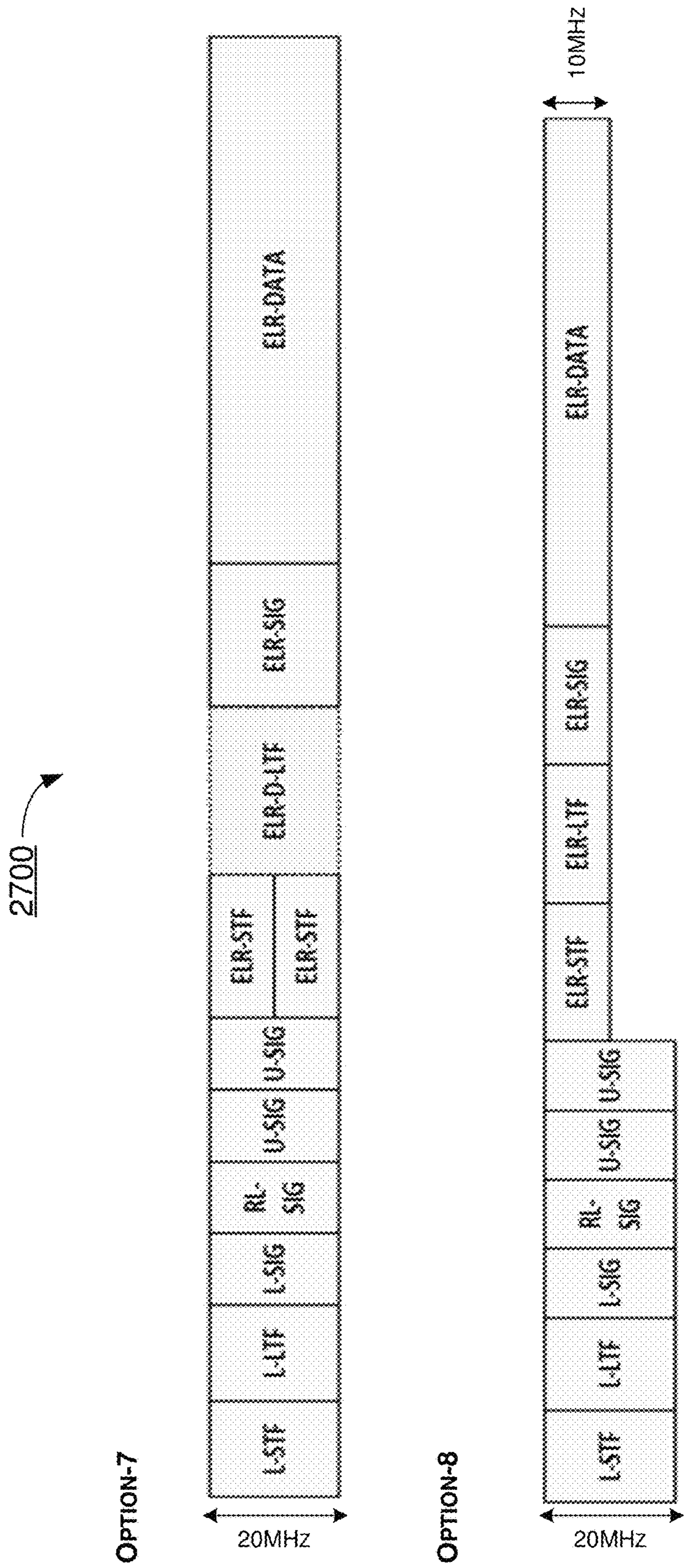
FIG. 27 is a diagram of an example design under a proposed scheme in accordance with the present disclosure.

FIG. 25 illustrates an example design 2500 under a proposed scheme in accordance with the present disclosure. Design 2500 may pertain to a PPDU for 10 MHz transmission in next-generation ELR WLANs under first, second and third options (Option-1, Option-2 and Option-3). FIG. 26 illustrates an example design 2600 under a proposed scheme in accordance with the present disclosure. Design 2600 may pertain to a PPDU for 10 MHz transmission in next-generation ELR WLANs under fourth, fifth and sixth options (Option-4, Option-5 and Option-6). FIG. 27 illustrates an example design 2700 under a proposed scheme in accordance with the present disclosure. Design 2700 may pertain to a PPDU for 10 MHz subchannel transmission in next-generation ELR WLANs under seventh and eighth options (Option-7 and Option-8).

In each of these designs of PPDU for 10 MHz transmission, the PPDU may include a spoofing preamble, an ELR preamble and ELR-Data, with the spoofing preamble including certain fields such as L-STF, L-LTF, L-SIG, RL-SIG, U-SIG and another U-SIG that are transmitted on a 20 MHz bandwidth. In Option-1 and Option-2, the ELR preamble may include ELR-STF, ELR-LTF and ELR-SIG. In Option-1, the ELR preamble and ELR-Data may be transmitted and processed on a per-10 MHz subchannel non-HT duplication basis, with two times (2×) duplication, and the duration of ELR-SIG may be parameter dependent (e.g., dependent on ΔF and so on). In Option-2, the ELR preamble may be transmitted and processed on a per-10 MHz subchannel non-HT duplication basis, with two times (2×) duplication, while ELR-Data may be transmitted on the 20 MHz bandwidth. Option-3 differs from Option-2 in that the ELR preamble in Option-3 may further include ELR-D-LTF, which may be transmitted on the 20 MHz bandwidth. The IEEE 802.11ax/be 20 MHz HE-LTF or EHT-LTF sequence may be reused for ELR-D-LTF and ELR-Data. The IEEE 802.11ax/be tone plan may be utilized for ELR-D-LTF and ELR-Data, and OFDMA multiple users may be supported.

Option-4 differs from Option-3 in that the ELR preamble in Option-4 may further include ELR-D-STF, which may be transmitted on the 20 MHz bandwidth. Option-5 differs from Option-4 in that: (1) the ELR-LTF may be replaced by ELR-LTF-Sync; and (2) ELR-SIG in Option-5 may be between ELR-D-LTF and ELR-Data, and ELR-SIG may be transmitted on the 20 MHz bandwidth. Option-6 differs from Option-5 in that there is no ELR-LTF-Sync (or ELR-LTF) in Option-6. The IEEE 802.11ax/be tone plan may be utilized for ELR-Data, and OFDMA multiple users may be supported.

Option-7 differs from Option-6 in that there is no ELR-D-STF in Option-7. Option-8 differs from Option-1 in that the ELR preamble and ELR-Data in Option-8 may be transmitted and processed on one 10 MHz subchannel with no duplication, and the duration of the ELR preamble may be parameter dependent (e.g., dependent on ΔF and so on). Design 2400 differs from design 2300 in that both the ELR preamble and ELR-Data in design 2400 may be transmitted on one narrow bandwidth 2.5 MHz subchannel without duplication. In some regions and countries, such as the US, narrow bandwidths may be beneficial for higher power per tone. However, in some other regions and countries, such as the EU, the maximum transmission power may be limited by the PSD requirement.

Under various proposed schemes in accordance with the present disclosure, narrow bandwidth transmission for ELR may be performed on a system bandwidth of 40 MHz. The 2.4 GHz frequency band supports both 20 MHz and 40 MHz channel bandwidths. The narrow bandwidth transmission for ELR on a 20 MHz system bandwidth according to various proposed schemes described above may be simply extended to ELR on the 40 MHz system bandwidth. The extension may involve proposed Option-1~Option-8 on 20 MHz duplicated on 40 MHz. Additionally, or alternatively, some options of ELR-D-STF/ELR-D-LTF/ELR-SIG and ELR-DATA may utilize the IEEE 802.11ax/11be 40 MHz tone plan.

Figure 28:
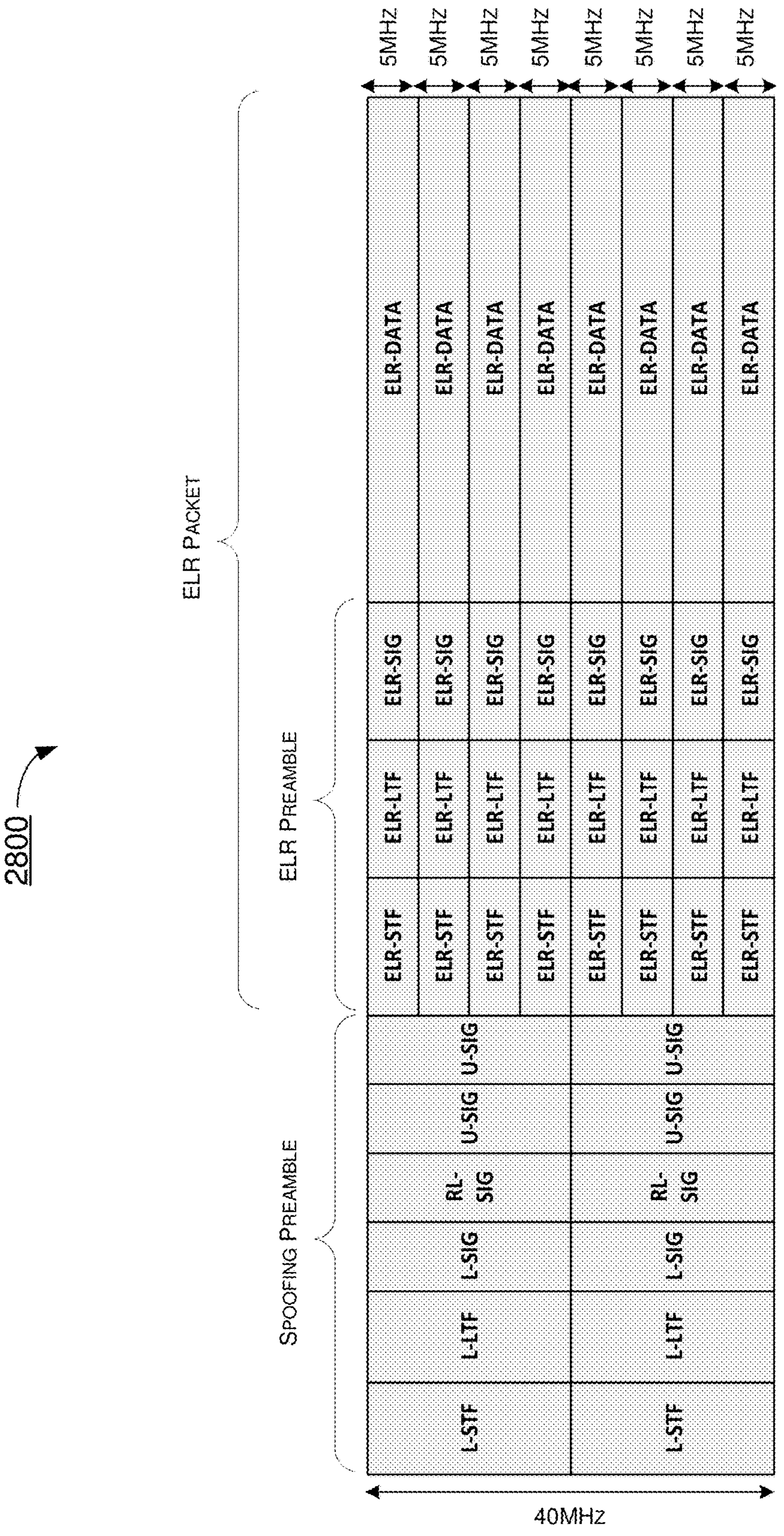
FIG. 28 is a diagram of an example design under a proposed scheme in accordance with the present disclosure.

FIG. 28 illustrates an example design 2800 under a proposed scheme in accordance with the present disclosure. Design 2800 may pertain to a PPDU for ELR transmission on 40 MHz in next-generation ELR WLANs under a first option (Option-1). In design 2800, the PPDU may include a spoofing preamble, an ELR preamble and ELR-Data. The spoofing preamble including certain fields such as L-STF, L-LTF, L-SIG, RL-SIG, U-SIG and another U-SIG that are transmitted on a 20 MHz bandwidth with two times (2×) duplication. The ELR preamble may include ELR-STF, ELR-LTF and ELR-SIG. The ELR preamble and ELR-Data may be transmitted and processed on a per-5 MHz subchannel non-HT duplication basis, with eight times (8×) duplication.

Figure 29:
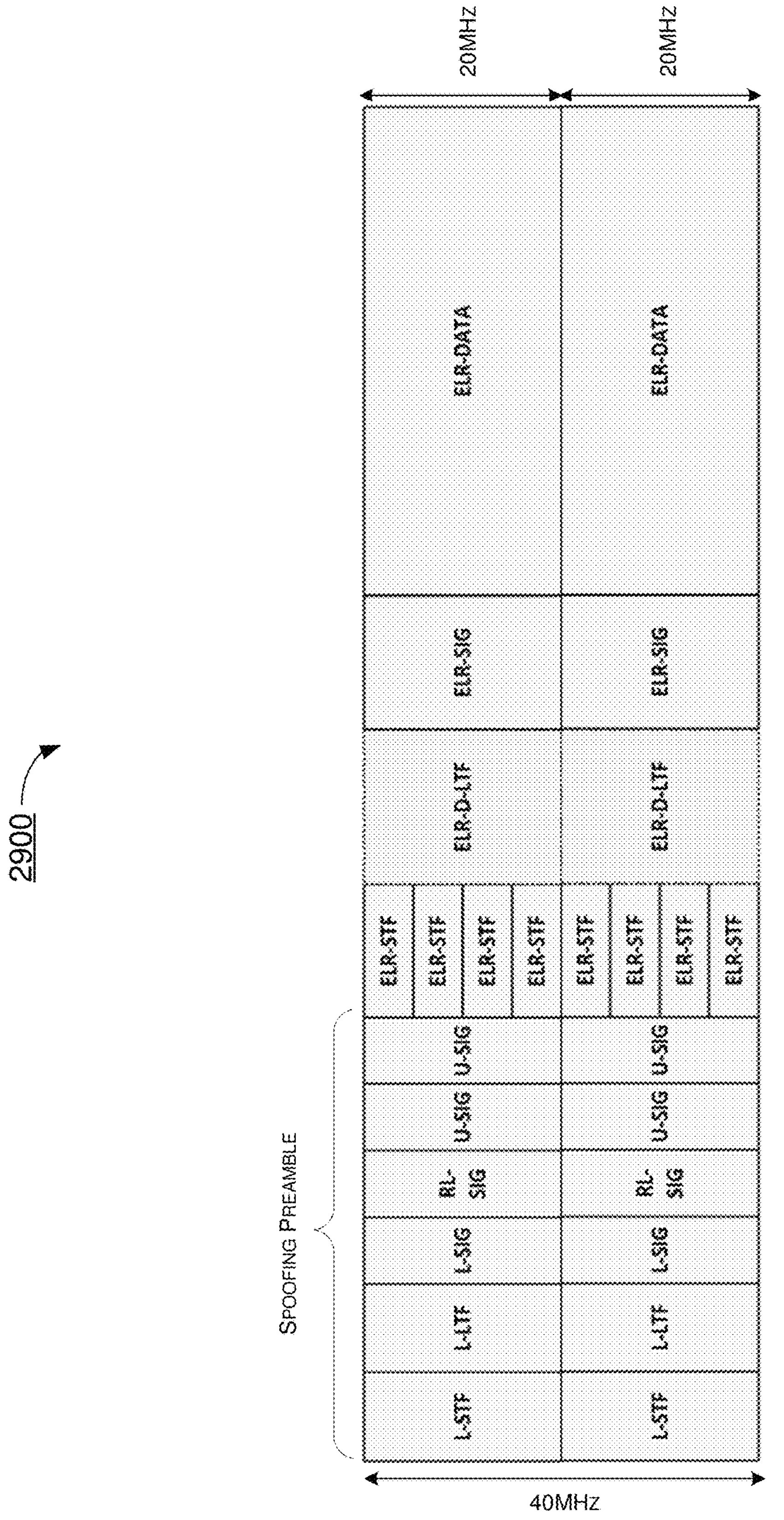
FIG. 29 is a diagram of an example design under a proposed scheme in accordance with the present disclosure.

FIG. 29 illustrates an example design 2900 under a proposed scheme in accordance with the present disclosure. Design 2900 may pertain to a PPDU for ELR transmission on 40 MHz in next-generation ELR WLANs under a second option (Option-2). In design 2900, the PPDU may include a spoofing preamble, an ELR preamble and ELR-Data. The spoofing preamble including certain fields such as L-STF, L-LTF, L-SIG, RL-SIG, U-SIG and another U-SIG that are transmitted on a 20 MHz bandwidth with two times (2×) duplication. The ELR preamble may include ELR-STF, ELR-D-LTF and ELR-SIG. The ELR-STF may be transmitted and processed on a per-5 MHz subchannel non-HT duplication basis, with eight times (8×) duplication. The ELR-D-LTF, ELR-SIG and ELR-Data may be transmitted on a 20 MHz bandwidth with two times (2×) duplication.

Figure 30:
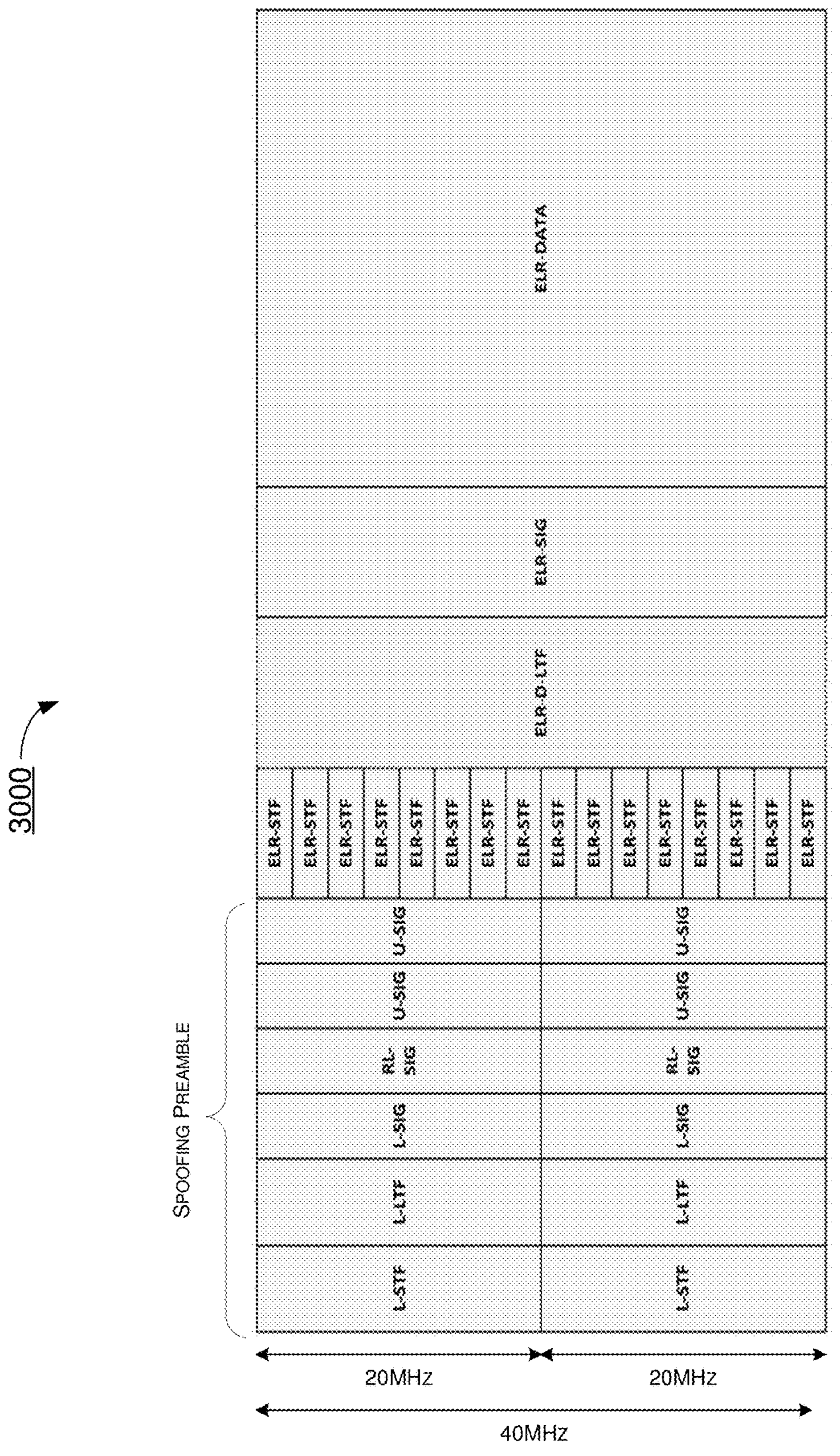
FIG. 30 is a diagram of an example design under a proposed scheme in accordance with the present disclosure.

FIG. 30 illustrates an example design 3000 under a proposed scheme in accordance with the present disclosure. Design 3000 may pertain to a PPDU for ELR transmission on 40 MHz in next-generation ELR WLANs under a third option (Option-3). In design 3000, the PPDU may include a spoofing preamble, an ELR preamble and ELR-Data. The spoofing preamble including certain fields such as L-STF, L-LTF, L-SIG, RL-SIG, U-SIG and another U-SIG that are transmitted on a 20 MHz bandwidth with two times (2×) duplication. The ELR preamble may include ELR-STF, ELR-D-LTF and ELR-SIG. The ELR-STF may be transmitted and processed on a per-2.5 MHz subchannel non-HT duplication basis, with sixteen times (16×) duplication. The ELR-D-LTF, ELR-SIG and ELR-Data may be transmitted on the 40 MHz system bandwidth with no duplication. The IEEE 802.11ax/11be 40 MHz tone plan may be utilized for ELR-D-LTF, ELR-SIG and ELR-Data.

Illustrative Implementations

Figure 31:
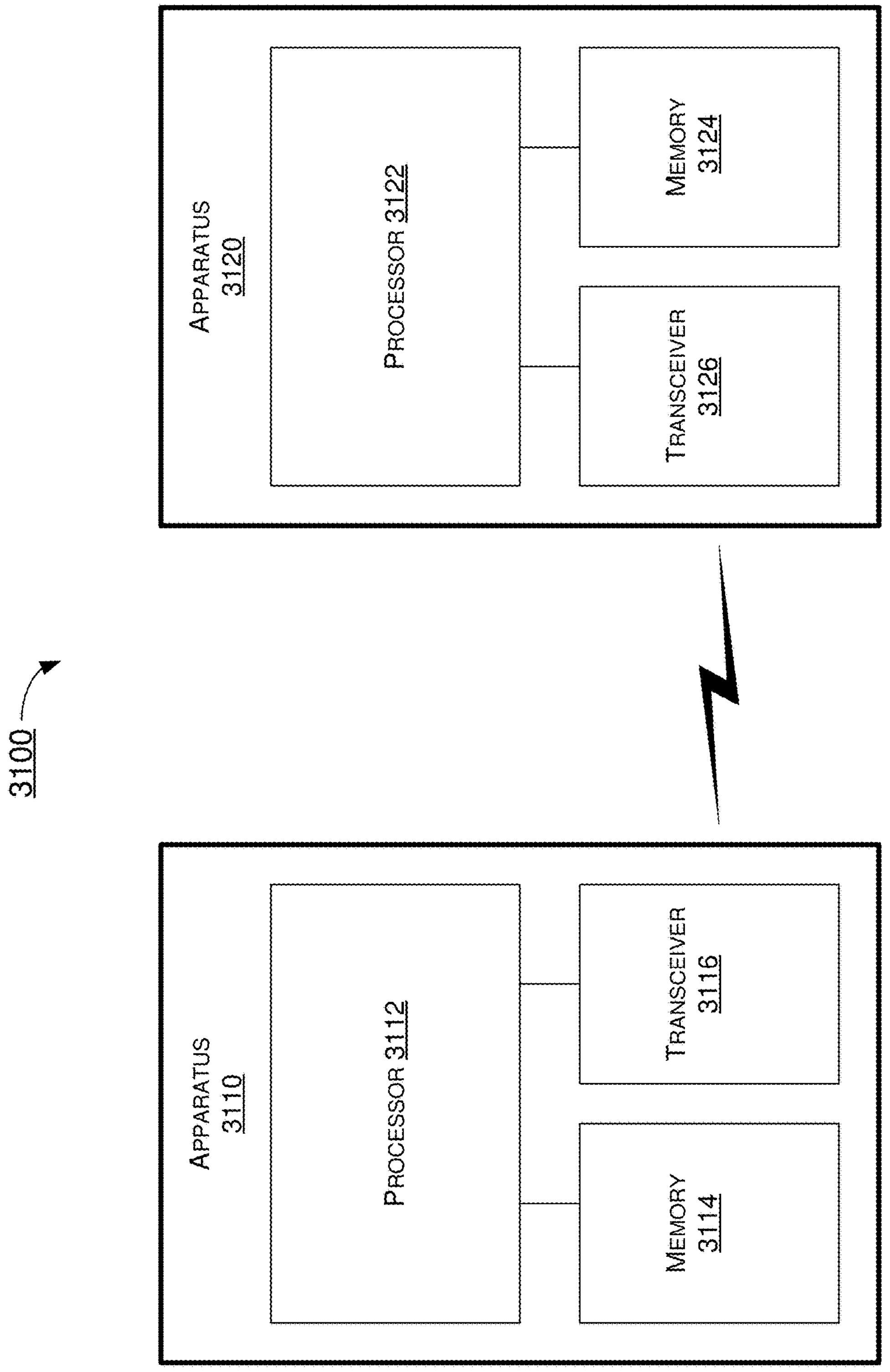
FIG. 31 is a block diagram of an example communication system in accordance with an implementation of the present disclosure.

FIG. 31 illustrates an example system 3100 having at least an example apparatus 3110 and an example apparatus 3120 in accordance with an implementation of the present disclosure. Each of apparatus 3110 and apparatus 3120 may perform various functions to implement schemes, techniques, processes and methods described herein pertaining to narrow bandwidth transmission schemes in next-generation ELR WLANs, including the various schemes described above with respect to various proposed designs, concepts, schemes, systems and methods described above as well as processes described below. For instance, apparatus 3110 may be implemented in STA 110 and apparatus 3120 may be implemented in STA 120, or vice versa.

Each of apparatus 3110 and apparatus 3120 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 3110 and apparatus 3120 may be implemented in a smartphone, a smart watch, a personal digital assistant, a digital camera, or a computing equipment such as a tablet computer, a laptop computer or a notebook computer. Each of apparatus 3110 and apparatus 3120 may also be a part of a machine type apparatus, which may be an IoT apparatus such as an immobile or a stationary apparatus, a home apparatus, a wire communication apparatus or a computing apparatus. For instance, each of apparatus 3110 and apparatus 3120 may be implemented in a smart thermostat, a smart fridge, a smart door lock, a wireless speaker or a home control center. When implemented in or as a network apparatus, apparatus 3110 and/or apparatus 3120 may be implemented in a network node, such as an AP in a WLAN.

In some implementations, each of apparatus 3110 and apparatus 3120 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 3110 and apparatus 3120 may be implemented in or as a STA or an AP. Each of apparatus 3110 and apparatus 3120 may include at least some of those components shown in FIG. 31 such as a processor 3112 and a processor 3122, respectively, for example. Each of apparatus 3110 and apparatus 3120 may further include one or more other components not pertinent to the proposed scheme of the present disclosure (e.g., internal power supply, display device and/or user interface device), and, thus, such component(s) of apparatus 3110 and apparatus 3120 are neither shown in FIG. 31 nor described below in the interest of simplicity and brevity.

In one aspect, each of processor 3112 and processor 3122 may be implemented in the form of one or more single-core processors, one or more multi-core processors, one or more RISC processors or one or more CISC processors. That is, even though a singular term "a processor" is used herein to refer to processor 3112 and processor 3122, each of processor 3112 and processor 3122 may include multiple processors in some implementations and a single processor in other implementations in accordance with the present disclosure. In another aspect, each of processor 3112 and processor 3122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 3112 and processor 3122 is a special-purpose machine specifically designed, arranged and configured to perform specific tasks including those pertaining to narrow bandwidth transmission schemes in next-generation ELR WLANs in accordance with various implementations of the present disclosure.

In some implementations, apparatus 3110 may also include a transceiver 3116 coupled to processor 3112. Transceiver 3116 may include a transmitter capable of wirelessly transmitting and a receiver capable of wirelessly receiving data. In some implementations, apparatus 3120 may also include a transceiver 3126 coupled to processor 3122. Transceiver 3126 may include a transmitter capable of wirelessly transmitting and a receiver capable of wirelessly receiving data. It is noteworthy that, although transceiver 3116 and transceiver 3126 are illustrated as being external to and separate from processor 3112 and processor 3122, respectively, in some implementations, transceiver 3116 may be an integral part of processor 3112 as a system on chip (SoC), and transceiver 3126 may be an integral part of processor 3122 as a SoC.

In some implementations, apparatus 3110 may further include a memory 3114 coupled to processor 3112 and capable of being accessed by processor 3112 and storing data therein. In some implementations, apparatus 3120 may further include a memory 3124 coupled to processor 3122 and capable of being accessed by processor 3122 and storing data therein. Each of memory 3114 and memory 3124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 3114 and memory 3124 may include a type of read-only memory (ROM) such as mask ROM, programmable ROM (PROM), erasable programmable ROM (EPROM) and/or electrically erasable programmable ROM (EEPROM). Alternatively, or additionally, each of memory 3114 and memory 3124 may include a type of non-volatile random-access memory (NVRAM) such as flash memory, solid-state memory, ferroelectric RAM (FeRAM), magnetoresistive RAM (MRAM) and/or phase-change memory.

Each of apparatus 3110 and apparatus 3120 may be a communication entity capable of communicating with each other using various proposed schemes in accordance with the present disclosure. For illustrative purposes and without limitation, functionalities and capabilities of apparatus 3110, as STA 110, and apparatus 3120, as STA 120, may be described below in the context of example process 3200. It is noteworthy that, although a detailed description of capabilities, functionalities and/or technical features of one of apparatus 3110 and apparatus 3120 is provided below, the same may be applied to the other of apparatus 3110 and apparatus 3120 although a detailed description thereof is not provided solely in the interest of brevity. It is also noteworthy that, although the example implementations described below are provided in the context of WLAN, the same may be implemented in other types of networks.

Illustrative Processes

Figure 32:
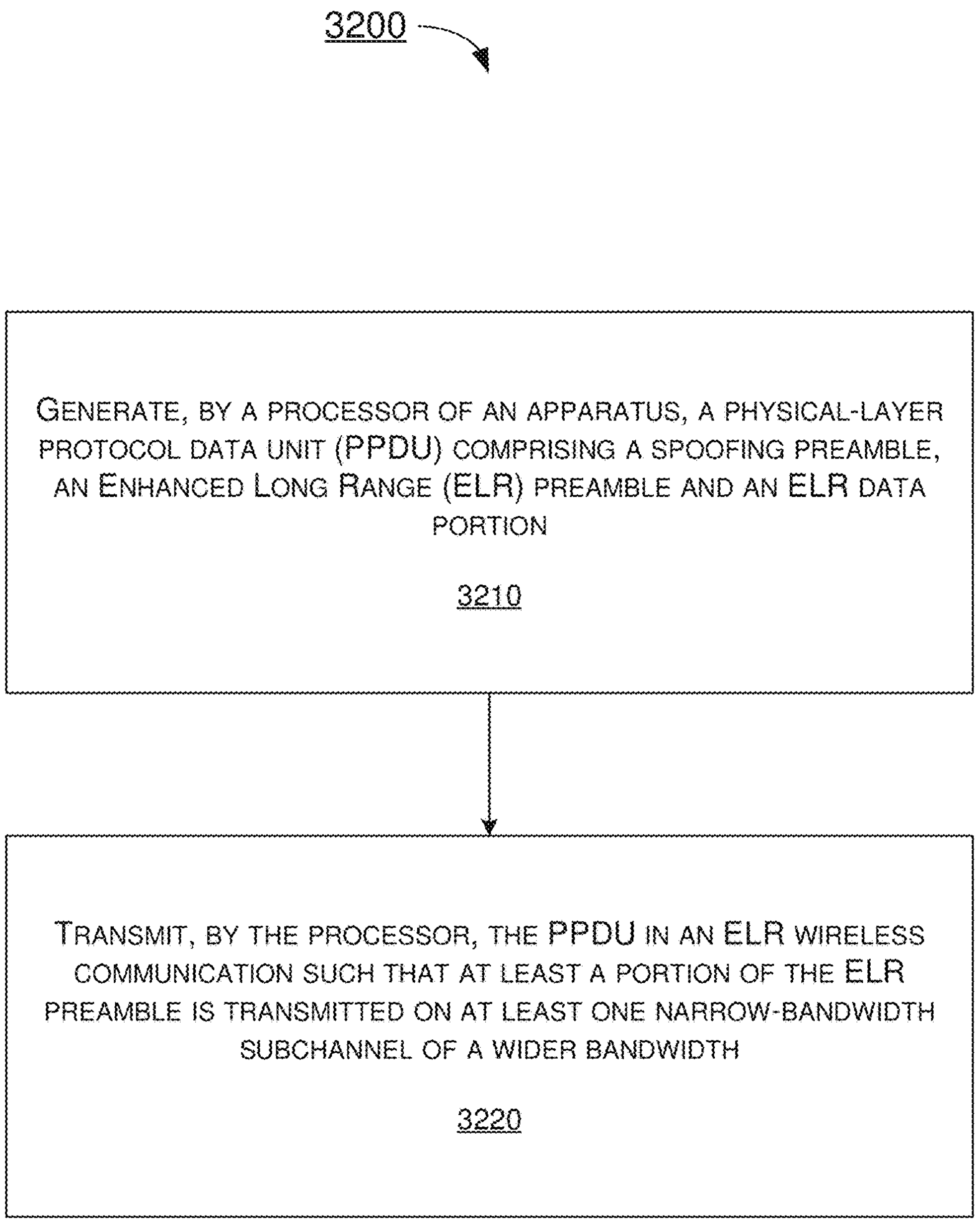
FIG. 32 is a flowchart of an example process in accordance with an implementation of the present disclosure.

FIG. 32 illustrates an example process 3200 in accordance with an implementation of the present disclosure. Process 3200 may represent an aspect of implementing various proposed designs, concepts, schemes, systems and methods described above. More specifically, process 3200 may represent an aspect of the proposed concepts and schemes pertaining to narrow bandwidth transmission schemes in next-generation ELR WLANs in accordance with the present disclosure. Process 3200 may include one or more operations, actions, or functions as illustrated by one or more of blocks 3210 and 3220. Although illustrated as discrete blocks, various blocks of process 3200 may be divided into additional blocks, combined into fewer blocks, or eliminated, depending on the desired implementation. Moreover, the blocks/sub-blocks of process 3200 may be executed in the order shown in FIG. 32 or, alternatively, in a different order. Furthermore, one or more of the blocks/sub-blocks of process 3200 may be executed repeatedly or iteratively. Process 3200 may be implemented by or in apparatus 3110 and apparatus 3120 as well as any variations thereof. Solely for illustrative purposes and without limiting the scope, process 3200 is described below in the context of apparatus 3110 implemented in or as STA 110 functioning as a non-AP STA and apparatus 3120 implemented in or as STA 120 functioning as an AP STA of a wireless network such as a WLAN in network environment 100 in accordance with one or more of IEEE 802.11 standards. Process 3200 may begin at block 3210.

At 3210, process 3200 may involve processor 3112 of apparatus 3110 generating a PPDU comprising a spoofing preamble, an ELR preamble and an ELR data portion. Process 3200 may proceed from 3210 to 3220.

At 3220, process 3200 may involve processor 3112 transmitting, via transceiver 3116, the PPDU in an ELR wireless communication such that at least a portion of the ELR preamble is transmitted on at least one narrow-bandwidth subchannel of a wider bandwidth.

In some implementations, in transmitting the PPDU, process 3200 may involve processor 3112 performing operations including: (a) transmitting the spoofing preamble on the wider bandwidth; (b) transmitting an ELR-STF, an ELR-LTF and an ELR-SIG of the ELR preamble on a per-narrow-bandwidth subchannel duplication basis with multiple times of duplication over the wider bandwidth; and (c) transmitting the ELR data portion on the per-narrow-bandwidth subchannel duplication basis with multiple times of duplication over the wider bandwidth.

In some implementations, in transmitting the PPDU, process 3200 may involve processor 3112 performing operations including: (a) transmitting the spoofing preamble on the wider bandwidth; (b) transmitting an ELR-STF, an ELR-LTF and an ELR-SIG of the ELR preamble on a per-narrow-bandwidth subchannel duplication basis with multiple times of duplication over the wider bandwidth; and (c) transmitting the ELR data portion on the wider bandwidth.

In some implementations, in transmitting the PPDU, process 3200 may involve processor 3112 performing operations including: (a) transmitting the spoofing preamble on the wider bandwidth; (b) transmitting an ELR-STF, an ELR-LTF and an ELR-SIG of the ELR preamble on a per-narrow-bandwidth subchannel duplication basis with multiple times of duplication over the wider bandwidth; and (c) transmitting an ELR-D-LTF and the ELR data portion on the wider bandwidth.

In some implementations, in transmitting the PPDU, process 3200 may involve processor 3112 performing operations including: (a) transmitting the spoofing preamble on the wider bandwidth; (b) transmitting an ELR-STF, an ELR-LTF and an ELR-SIG of the ELR preamble on a per-narrow-bandwidth subchannel duplication basis with multiple times of duplication over the wider bandwidth; and (c) transmitting an ELR-D-STF, an ELR-D-LTF and the ELR data portion on the wider bandwidth.

In some implementations, in transmitting the PPDU, process 3200 may involve processor 3112 performing operations including: (a) transmitting the spoofing preamble on the wider bandwidth; (b) transmitting an ELR-STF and an ELR-LTF-Sync of the ELR preamble on a per-narrow-bandwidth subchannel duplication basis with multiple times of duplication over the wider bandwidth; and (c) transmitting an ELR-D-STF, an ELR-D-LTF, an ELR-SIG and the ELR data portion on the wider bandwidth.

In some implementations, in transmitting the PPDU, process 3200 may involve processor 3112 performing operations including: (a) transmitting the spoofing preamble on the wider bandwidth; (b) transmitting an ELR-STF of the ELR preamble on a per-narrow-bandwidth subchannel duplication basis with multiple times of duplication over the wider bandwidth; and (c) transmitting an ELR-D-STF, ELR-D-LTF, an ELR-SIG and the ELR data portion on the wider bandwidth.

In some implementations, in transmitting the PPDU, process 3200 may involve processor 3112 performing operations including: (a) transmitting the spoofing preamble on the wider bandwidth; (b) transmitting an ELR-STF of the ELR preamble on a per-narrow-bandwidth subchannel duplication basis with multiple times of duplication over the wider bandwidth; and (c) transmitting an ELR-D-LTF, an ELR-SIG and the ELR data portion on the wider bandwidth.

In some implementations, in transmitting the PPDU, process 3200 may involve processor 3112 performing operations including: (a) transmitting the spoofing preamble on the wider bandwidth; and (b) transmitting an ELR-STF, an ELR-LTF and an ELR-SIG of the ELR preamble and the ELR data portion on the at least one narrow-bandwidth subchannel.

In some implementations, the wider bandwidth may be 20 MHz and each of the at least one narrow-bandwidth subchannel may be 2.5 MHz, 5 MHz or 10 MHz. Moreover, a subcarrier spacing may be scalable with 312.5 kHz*1/($2^n$), n=0, 1, 2, 3 for 20 MHz, 10 MHz, 5 MHz and 2.5 MHz, respectively. Furthermore, a FFT size ($N_{fft}$)=32 or 64.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating, by a processor of an apparatus, a physical-layer protocol data unit (PPDU) comprising a spoofing preamble, an Enhanced Long Range (ELR) preamble and an ELR data portion; and transmitting, by the processor, the PPDU in an ELR wireless communication, wherein the spoofing preamble is transmitted over an entire wider bandwidth of the PPDU, wherein at least a portion of the ELR preamble is transmitted on at least one narrow-bandwidth subchannel of a wider bandwidth, and wherein at least the portion of the ELR preamble occupies the at least one narrow-bandwidth subchannel without being duplicated across the entire wider bandwidth.

2. The method of claim 1, wherein the transmitting of the PPDU comprises:

transmitting the spoofing preamble on the wider bandwidth;

transmitting an ELR short training field (ELR-STF), an ELR long training field (ELR-LTF) and an ELR signal field (ELR-SIG) of the ELR preamble on a per-narrow-bandwidth subchannel duplication basis with multiple times of duplication over the wider bandwidth; and transmitting the ELR data portion on the per-narrow-bandwidth subchannel duplication basis with multiple times of duplication over the wider bandwidth.

3. The method of claim 1, wherein the transmitting of the PPDU comprises:

transmitting the spoofing preamble on the wider bandwidth;

transmitting an ELR short training field (ELR-STF), an ELR long training field (ELR-LTF) and an ELR signal field (ELR-SIG) of the ELR preamble on a per-narrow-bandwidth subchannel duplication basis with multiple times of duplication over the wider bandwidth; and transmitting the ELR data portion on the wider bandwidth.

4. The method of claim 1, wherein the transmitting of the PPDU comprises:

transmitting the spoofing preamble on the wider bandwidth;

transmitting an ELR short training field (ELR-STF), an ELR long training field (ELR-LTF) and an ELR signal field (ELR-SIG) of the ELR preamble on a per-narrow-bandwidth subchannel duplication basis with multiple times of duplication over the wider bandwidth; and transmitting an ELR data long training field (ELR-D-LTF) and the ELR data portion on the wider bandwidth.

5. The method of claim 1, wherein the transmitting of the PPDU comprises:

transmitting the spoofing preamble on the wider bandwidth;

transmitting an ELR short training field (ELR-STF), an ELR long training field (ELR-LTF) and an ELR signal field (ELR-SIG) of the ELR preamble on a per-narrow-bandwidth subchannel duplication basis with multiple times of duplication over the wider bandwidth; and transmitting an ELR data short training field (ELR-D-STF), an ELR data long training field (ELR-D-LTF) and the ELR data portion on the wider bandwidth.

6. The method of claim 1, wherein the transmitting of the PPDU comprises:

transmitting the spoofing preamble on the wider bandwidth;

transmitting an ELR short training field (ELR-STF) and an ELR long training synchronization field (ELR-LTF-Sync) of the ELR preamble on a per-narrow-bandwidth subchannel duplication basis with multiple times of duplication over the wider bandwidth; and transmitting an ELR data short training field (ELR-D-STF), an ELR data long training field (ELR-D-LTF), an ELR signal field (ELR-SIG) and the ELR data portion on the wider bandwidth.

7. The method of claim 1, wherein the transmitting of the PPDU comprises:

transmitting the spoofing preamble on the wider bandwidth;

transmitting an ELR short training field (ELR-STF) of the ELR preamble on a per-narrow-bandwidth subchannel duplication basis with multiple times of duplication over the wider bandwidth; and transmitting an ELR data short training field (ELR-D-STF), an ELR data long training field (ELR-D-LTF), an ELR signal field (ELR-SIG) and the ELR data portion on the wider bandwidth.

8. The method of claim 1, wherein the transmitting of the PPDU comprises:

transmitting the spoofing preamble on the wider bandwidth;

transmitting an ELR short training field (ELR-STF) of the ELR preamble on a per-narrow-bandwidth subchannel duplication basis with multiple times of duplication over the wider bandwidth; and transmitting an ELR data long training field (ELR-D-LTF), an ELR signal field (ELR-SIG) and the ELR data portion on the wider bandwidth.

9. The method of claim 1, wherein the transmitting of the PPDU comprises:

transmitting the spoofing preamble on the wider bandwidth; and transmitting an ELR short training field (ELR-STF), an ELR long training field (ELR-LTF) and an ELR signal field (ELR-SIG) of the ELR preamble and the ELR data portion on the at least one narrow-bandwidth subchannel.

10. The method of 1, wherein:

the wider bandwidth is 20 MHz and each of the at least one narrow-bandwidth subchannel is 2.5 MHz, 5 MHz or 10 MHz;

a subcarrier spacing is scalable with 312.5 kHz*1/($2^n$), n=0, 1, 2, 3 for 20 MHz, 10 MHz, 5 MHz and 2.5 MHz, respectively; and a fast Fourier transform (FFT) size ($N_{fft}$)=32 or 64.

11. An apparatus, comprising:

a transceiver configured to communicate wirelessly; and a processor coupled to the transceiver and configured to perform operations comprising:

generating a physical-layer protocol data unit (PPDU) comprising a spoofing preamble, an Enhanced Long Range (ELR) preamble and an ELR data portion; and transmitting, via the transceiver, the PPDU in an ELR wireless communication, wherein the spoofing preamble is transmitted over an entire wider bandwidth of the PPDU, wherein at least a portion of the ELR preamble is transmitted on at least one narrow-bandwidth subchannel of a wider bandwidth, and wherein at least the portion of the ELR preamble occupies the at least one narrow-bandwidth subchannel without being duplicated across the entire wider bandwidth.

12. The apparatus of claim 11, wherein the transmitting of the PPDU comprises:

transmitting the spoofing preamble on the wider bandwidth;

transmitting an ELR short training field (ELR-STF), an ELR long training field (ELR-LTF) and an ELR signal field (ELR-SIG) of the ELR preamble on a per-narrow-bandwidth subchannel duplication basis with multiple times of duplication over the wider bandwidth; and transmitting the ELR data portion on the per-narrow-bandwidth subchannel duplication basis with multiple times of duplication over the wider bandwidth.

13. The apparatus of claim 11, wherein the transmitting of the PPDU comprises:

transmitting the spoofing preamble on the wider bandwidth;

transmitting an ELR short training field (ELR-STF), an ELR long training field (ELR-LTF) and an ELR signal field (ELR-SIG) of the ELR preamble on a per-narrow-bandwidth subchannel duplication basis with multiple times of duplication over the wider bandwidth; and transmitting the ELR data portion on the wider bandwidth.

14. The apparatus of claim 11, wherein the transmitting of the PPDU comprises:

transmitting the spoofing preamble on the wider bandwidth;

transmitting an ELR short training field (ELR-STF), an ELR long training field (ELR-LTF) and an ELR signal field (ELR-SIG) of the ELR preamble on a per-narrow-bandwidth subchannel duplication basis with multiple times of duplication over the wider bandwidth; and transmitting an ELR data long training field (ELR-D-LTF) and the ELR data portion on the wider bandwidth.

15. The apparatus of claim 11, wherein the transmitting of the PPDU comprises:

transmitting the spoofing preamble on the wider bandwidth;

transmitting an ELR short training field (ELR-STF) and an ELR long training field (ELR-LTF) and an ELR signal field (ELR-SIG) of the ELR preamble on a per-narrow-bandwidth subchannel duplication basis with multiple times of duplication over the wider bandwidth; and transmitting an ELR data short training field (ELR-D-STF), an ELR data long training field (ELR-D-LTF) and the ELR data portion on the wider bandwidth.

16. The apparatus of claim 11, wherein the transmitting of the PPDU comprises:

transmitting the spoofing preamble on the wider bandwidth;

transmitting an ELR short training field (ELR-STF), an ELR long training synchronization field (ELR-LTF-Sync) of the ELR preamble on a per-narrow-bandwidth subchannel duplication basis with multiple times of duplication over the wider bandwidth; and transmitting an ELR data short training field (ELR-D-STF), an ELR data long training field (ELR-D-LTF), an ELR signal field (ELR-SIG) and the ELR data portion on the wider bandwidth.

17. The apparatus of claim 11, wherein the transmitting of the PPDU comprises:

transmitting the spoofing preamble on the wider bandwidth;

transmitting an ELR short training field (ELR-STF) of the ELR preamble on a per-narrow-bandwidth subchannel duplication basis with multiple times of duplication over the wider bandwidth; and transmitting an ELR data short training field (ELR-D-STF), an ELR data long training field (ELR-D-LTF), an ELR signal field (ELR-SIG) and the ELR data portion on the wider bandwidth.

18. The apparatus of claim 11, wherein the transmitting of the PPDU comprises:

transmitting the spoofing preamble on the wider bandwidth;

transmitting an ELR short training field (ELR-STF) of the ELR preamble on a per-narrow-bandwidth subchannel duplication basis with multiple times of duplication over the wider bandwidth; and transmitting an ELR data long training field (ELR-D-LTF), an ELR signal field (ELR-SIG) and the ELR data portion on the wider bandwidth.

19. The apparatus of claim 11, wherein the transmitting of the PPDU comprises:

transmitting the spoofing preamble on the wider bandwidth; and transmitting an ELR short training field (ELR-STF), an ELR long training field (ELR-LTF) and an ELR signal field (ELR-SIG) of the ELR preamble and the ELR data portion on the at least one narrow-bandwidth subchannel.

20. A method, comprising:

generating, by a processor of an apparatus, a physical-layer protocol data unit (PPDU) comprising a spoofing preamble, an Enhanced Long Range (ELR) preamble and an ELR data portion, wherein the spoofing preamble comprises a legacy short training field (L-STF), a legacy long training field (L-LTF), a legacy signal (L-SIG) field, a repeated legacy signal (RL-SIG) field, a universal signal (U-SIG) field, and another U-SIG field; and transmitting, by the processor, the PPDU in an ELR wireless communication, wherein at least a portion of the ELR preamble is transmitted on at least one narrow-bandwidth subchannel of a wider bandwidth, wherein the spoofing preamble is transmitted on the wider bandwidth, and wherein the ELR wireless communication is a wireless communication based on at least one of IEEE 802.11be and IEEE 802.11bn.

* * * * *